(12) United States Patent
Goenka et al.

(10) Patent No.: US 11,526,556 B2
(45) Date of Patent: Dec. 13, 2022

(54) PRESENTING CONTENT OF AN APPLICATION

(71) Applicant: Oath Inc., New York, NY (US)

(72) Inventors: Mohit Goenka, Santa Clara, CA (US); Nikita Varma, Milpitas, CA (US); Ashish Khusal Dharamshi, Sunnyvale, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 305 days.

(21) Appl. No.: 16/055,783

(22) Filed: Aug. 6, 2018

(65) Prior Publication Data
US 2020/0042652 A1    Feb. 6, 2020

(51) Int. Cl.
| | |
|---|---|
| *G06F 16/9038* | (2019.01) |
| *G06F 3/04842* | (2022.01) |
| *G06F 16/435* | (2019.01) |
| *G06F 16/904* | (2019.01) |
| *H04L 67/50* | (2022.01) |

(52) U.S. Cl.
CPC ...... *G06F 16/9038* (2019.01); *G06F 3/04842* (2013.01); *G06F 16/437* (2019.01); *G06F 16/904* (2019.01); *H04L 67/535* (2022.05)

(58) Field of Classification Search
CPC .. G06F 16/9038; G06F 16/437; G06F 16/904; G06F 3/04842; H04L 67/22
See application file for complete search history.

(56) References Cited

U.S. PATENT DOCUMENTS

| | | | | |
|---|---|---|---|---|
| 9,277,405 | B2* | 3/2016 | L'Heureux | H04W 36/0022 |
| 2009/0006467 | A1* | 1/2009 | Visscher | G06Q 10/06 |
| 2013/0143527 | A1* | 6/2013 | Randazzo | H04W 8/18 |
| | | | | 455/411 |
| 2013/0318157 | A1* | 11/2013 | Harrison | H04L 67/16 |
| | | | | 709/203 |
| 2015/0149544 | A1* | 5/2015 | Zhang | G06Q 10/109 |
| | | | | 709/204 |
| 2016/0021051 | A1* | 1/2016 | Peterson | H04L 51/32 |
| | | | | 707/722 |
| 2016/0179789 | A1* | 6/2016 | Chen | G06F 40/58 |
| | | | | 704/3 |
| 2016/0370956 | A1* | 12/2016 | Penha | H04N 21/4312 |

(Continued)

*Primary Examiner* — Ashish Thomas
*Assistant Examiner* — Yohanes D Kelemework
(74) *Attorney, Agent, or Firm* — Cooper Legal Group LLC

(57) ABSTRACT

One or more computing devices, systems, and/or methods for presenting content of an application are provided. For example, a first content interface, associated with an application, may be displayed using a first device. First activity performed using the first content interface may be detected. The first activity may be analyzed to generate a first activity profile associated with the first content interface. A first request to access the application may be received from the first device. The first activity profile may be selected from a plurality of activity profiles associated with the user account, based upon a determination that the first request is associated with the first content interface. Content items of the content items database may be prioritized, based upon the first activity profile, to generate a list of content items associated with the first content interface. The list of content items may be displayed by the first device.

20 Claims, 15 Drawing Sheets

(56) References Cited

U.S. PATENT DOCUMENTS

| | | | |
|---|---|---|---|
| 2017/0185687 A1* | 6/2017 | Pai | G06Q 10/101 |
| 2018/0032624 A1* | 2/2018 | Petersen | G06F 21/10 |
| 2018/0129814 A1* | 5/2018 | Barkie | G06F 16/9535 |
| 2018/0196880 A1* | 7/2018 | Carter | G06F 16/9535 |
| 2018/0367483 A1* | 12/2018 | Rodriguez | H04L 51/04 |

* cited by examiner

501 ⟶

575 ⟶

APPLICATION BACKEND

- DETERMINE DEVICE

DESKTOP COMPUTER 1

- DETERMINE LOCATION:

WORKPLACE

- DETERMINE TIME OF DAY::

1 TO 5 PM

- DETERMINE WEATHER CONDITIONS:

CLOUDY

- SELECT ACTIVITY PROFILE:

ACTIVITY PROFILE 2

- GENERATE LIST OF CONTENT ITEMS

FIG. 5G

PRESENTING CONTENT OF AN APPLICATION

BACKGROUND

Many applications, such as email applications, instant messaging applications, social network applications, news content applications, browser applications, video applications, music-streaming applications, etc. may allow a user to create an account for consuming content (e.g., emails, messages, news content, videos, music, etc.). The user may access an application on a first device. The user may want to consume a first type of content when using the first device. Alternatively and/or additionally, the user may access the application on a second device. The user may want to consume a second type of content when using the second device. However, in order to consume the first type of content using the first device and/or the second type of content using the second device, the user may need to scroll past other types of content that the user does not want to consume.

SUMMARY

In accordance with the present disclosure, one or more computing devices and/or methods are provided. In an example, a first graphical user interface of a first device, associated with a user account, is controlled to display a first content interface. The first content interface is a first version of an application and the first content interface comprises a first set of content items of a content items database associated with the application. First activity performed using the first content interface may be detected. The first activity may be analyzed to generate a first activity profile associated with the first content interface. A second graphical user interface, of a second device associated with the user account, may be controlled to display a second content interface. The second content interface may be a second version of the application. The second content interface may comprise a second set of content items of the content items database. Second activity performed using the second content interface may be detected. The second activity may be analyzed to generate a second activity profile associated with the second content interface. The first activity profile and the second activity profile may be included in a plurality of activity profiles associated with the user account. A first request to access the application may be received from the first device. The first activity profile may be selected, from the plurality of activity profiles, based upon a determination that the first request is associated with the first content interface. Content items of the content items database may be prioritized, based upon the first activity profile, to generate a first list of content items associated with the first content interface. The first graphical user interface may be controlled to display the first content interface comprising the first list of content items.

In an example, a first graphical user interface, of a first device associated with a user account, may be controlled to display a first content interface. The first content interface may be a first version of an application and the first content interface may comprise a first set of content items of a content items database associated with the application. One or more selections of one or more selectable inputs may be received. The one or more selectable inputs may be associated with one or more content items, of the first set of content items, and a second device associated with the user account. Content items of the content items database may be prioritized based upon the one or more selectable inputs to generate a first list of content items associated with the second device. The first list of content items may begin with the one or more content items. A first request to access the application may be received from the second device. The first list of content items may be selected from a plurality of lists of content items based upon a determination that the first request is associated with the second device. A second graphical user interface of the second device may be controlled to display a second content interface comprising the first list of content items. The second content interface may be a second version of the application.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5G is a component block diagram illustrating an example system for presenting content of an application, where a second activity profile is selected from a plurality of activity profiles.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
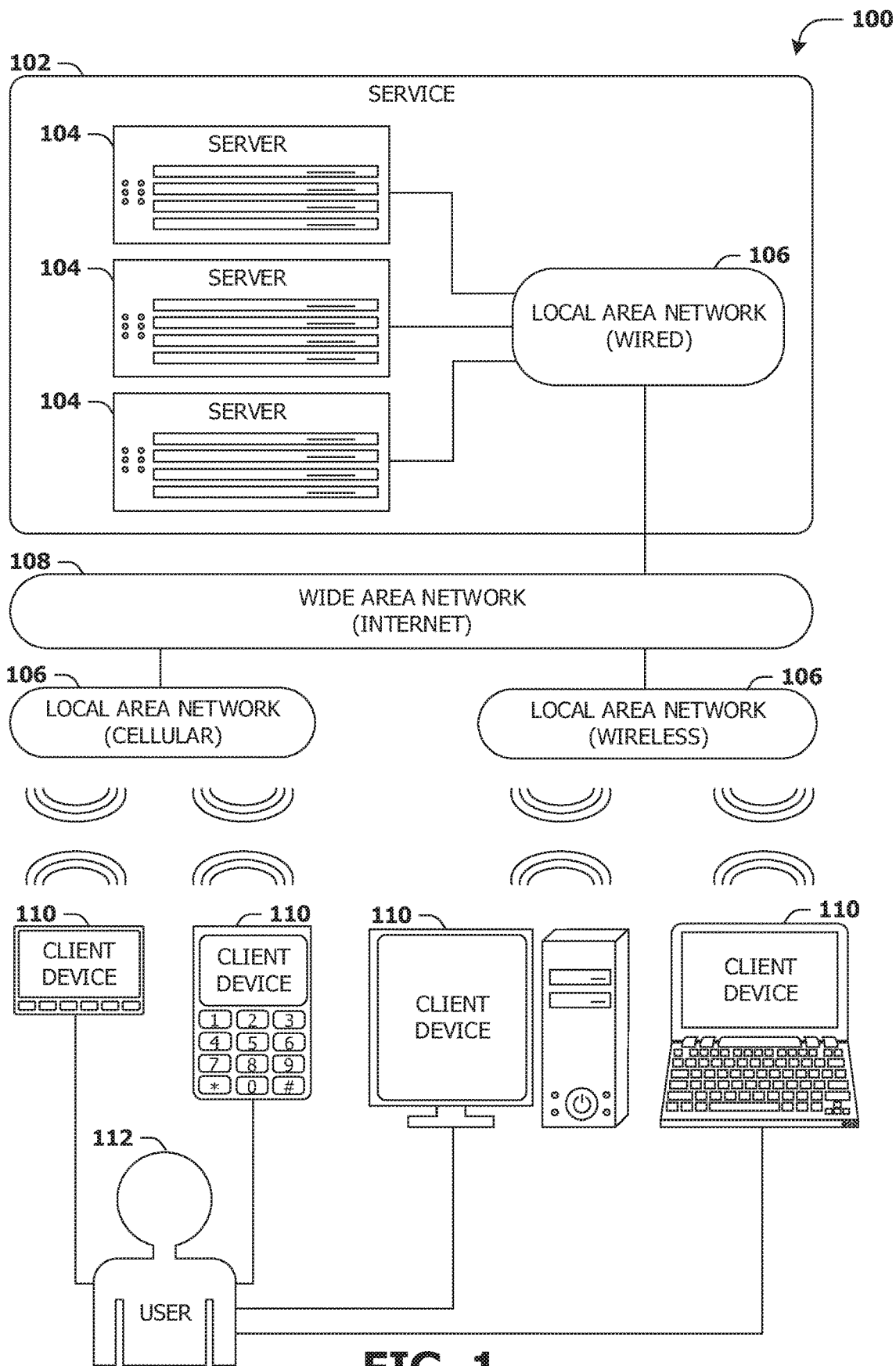
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
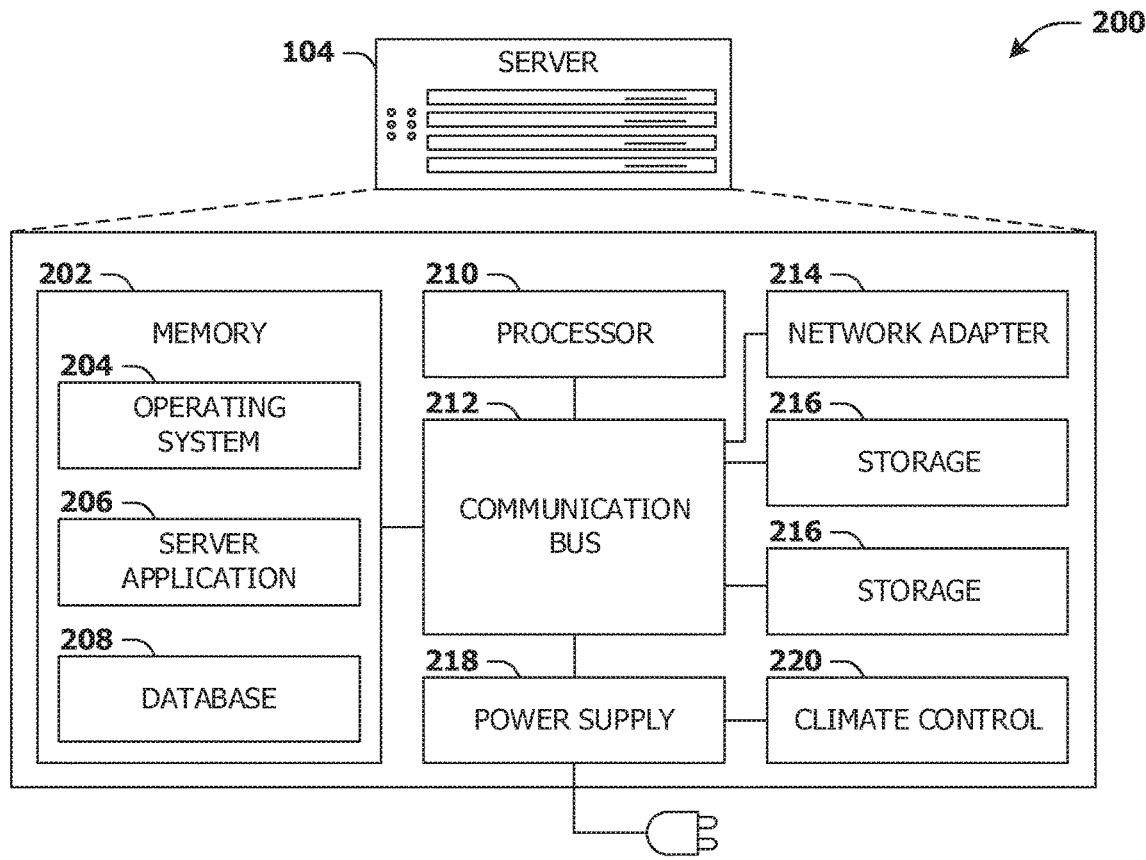
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
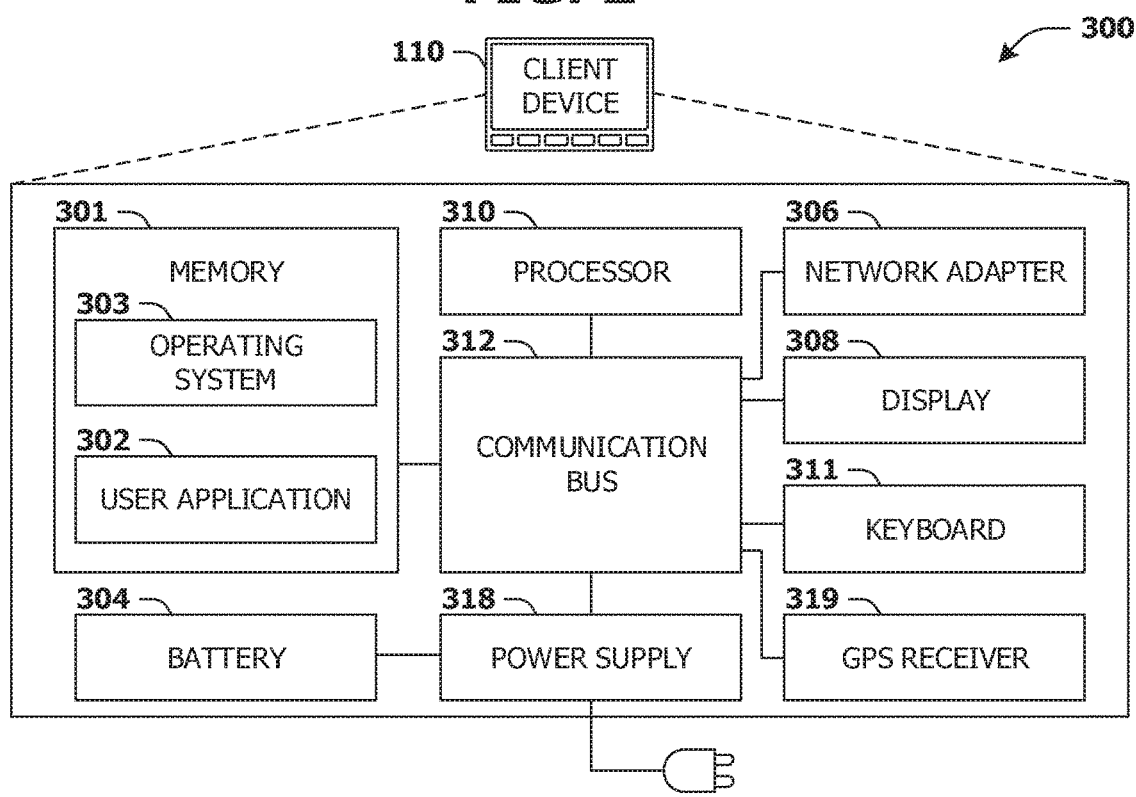
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for presenting content of an application are provided. For example, a user may access and/or interact with an application (e.g., an email application, a messaging application, a news content application, a browser application, a video application, a music-streaming application, etc.) for consuming content (e.g., emails, messages, news content, videos, music, etc.). In some examples, the application may be accessed and/or interacted with via a plurality of devices associated with a user account of the user. For example, a first version of the application may be installed on a first device (e.g., a smartphone, a tablet, an e-reader, a desktop computer, a laptop, etc.) associated with the user account. Alternatively and/or additionally, a second version of the application may be installed on a second device (e.g., a smartphone, a tablet, an e-reader, a desktop computer, a laptop, etc.) associated with the user account. In some examples, the user may prefer that first content items associated with one or more first types of content are presented by the first version of the application when using the first device. For example, the user may intend to use the first version of the application to consume the first content items.

However, in order to consume the first content items using the first device, the user may need to scroll past second content items associated with other types of content that the user does not intend to consume using the first device. For example, a list of content items may be presented using the first version of the application. The list of content items may comprise the second content items above and/or between the first content items. Thus, in accordance with one or more of the techniques presented herein, activity performed using the first device may be analyzed generate an activity profile comprising indications of the one or more first types of content (that the user may prefer to be presented when using the first device). The list of content items may be generated, for display on the first device, based upon the activity profile such that the list of content items may comprise the first content items (associated with the one or more first types of content) preceding the second content items (associated with the other types of content).

Figure 4A:
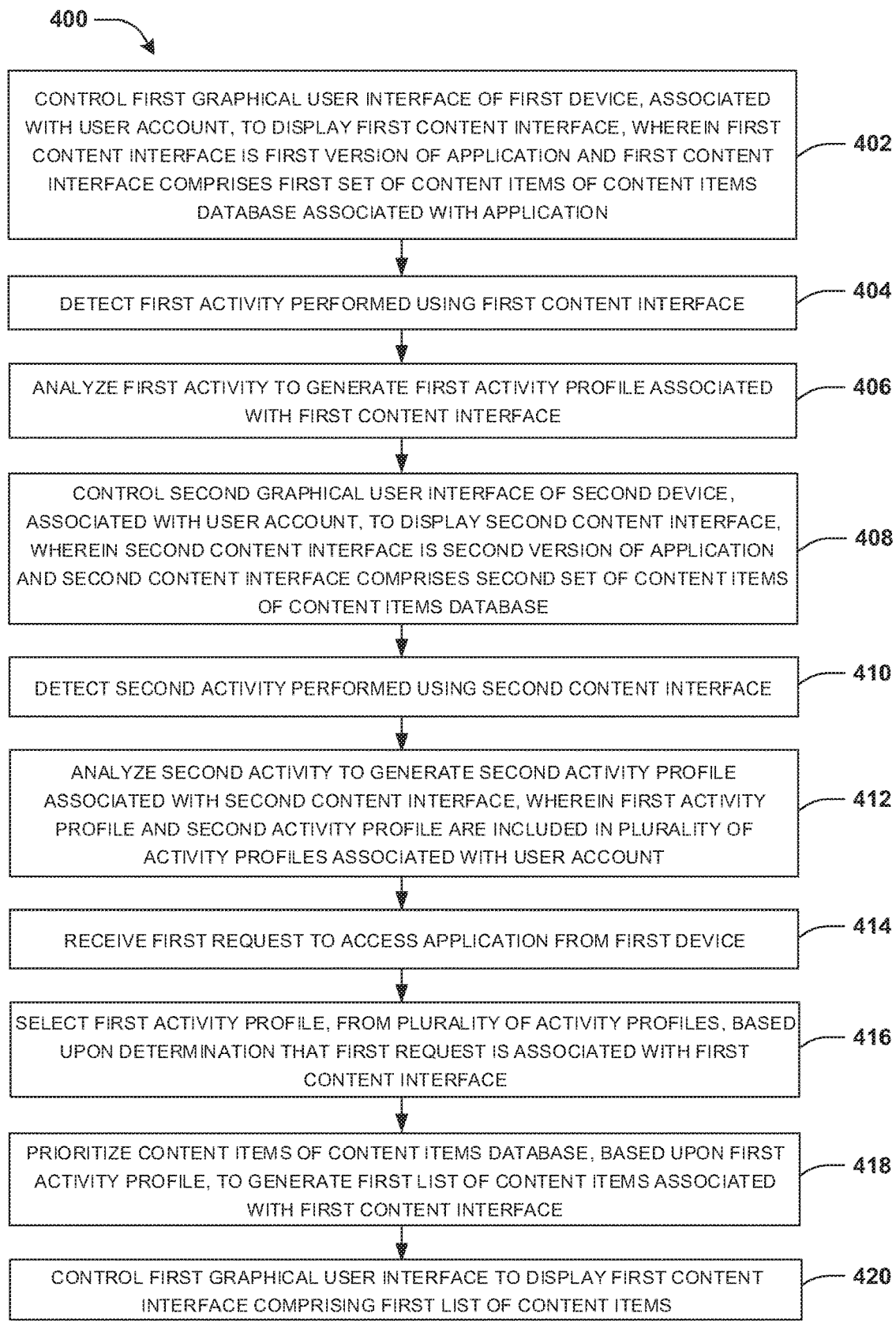
FIG. 4A is a flow chart illustrating an example method for presenting content of an application.

An embodiment of presenting content of an application is illustrated by an example method 400 of FIG. 4A. A user, such as user Jill, (e.g., and/or a client device associated with the user) may access and/or interact with an application (e.g., an email application, a messaging application, a news content application, a browser application, a video application, a music-streaming application, etc.) for consuming content (e.g., emails, messages, news content, videos, music, etc.). In some examples, the application may be accessed and/or interacted with via a plurality of devices associated with a user account of the user. For example, a first request to access the application may be received from a first client device of the plurality of devices (e.g., associated with the user account). At 402, a first graphical user interface of the first client device may be controlled to display a first content interface. In some examples, the first content interface may comprise a first set of content items of a content items database associated with the application.

In some examples, the first content interface may be a first version of the application, installed on the first client device. For example, software settings, one or more programming languages, etc. of the first content interface may be associated with an operating system of the first client device, a size of the first client device (e.g., a screen size of the first client device), etc. Alternatively and/or additionally, the first content interface may be a first web interface accessed via a browser of the first client device. Alternatively and/or additionally, the first content interface and/or the first client device may be associated with a first client device identification number, which may be used to identify the first client device and/or the first content interface.

In some examples, the content items database may comprise a plurality of content items. For example, the plurality of content items may comprise email items, message items, a news items, video items, audio items, etc. In some examples, the first set of content items may be included in a first list of content items. For example, the first list of content items may comprise representations of the first set of content items.

At 404, first activity performed using the first content interface may be detected. In some examples, the first activity may be associated with a first set of activity items of the first set of content items. For example, the first activity may comprise one or more first content items of the first set of activity items being selected (e.g., clicked, pressed, etc.) using a first touchscreen (e.g., of the first client device), one or more first switches (e.g., one or more buttons), a first conversational interface (e.g., a voice recognition and natural language interface), etc.

Alternatively and/or additionally, the first activity may comprise one or more second content items of the first set of activity items being consumed (e.g., the one or more second content items may be displayed for a threshold amount of time indicating that the one or more content items are viewed, read, etc., the one or more second content items may be outputted via a speaker of the first client device indicating that the one or more content items are listened to, etc.). Alternatively and/or additionally, the first activity may comprise one or more third content items of the first set of activity items undergoing a different type of activity (e.g., being shared, being forwarded, being replied to, being marked as important, being commented on, etc.).

In a first example, the application may be an email application and/or the first list of content items may comprise a list of email items. Accordingly, the first activity may comprise one or more email items being selected, one or more email items being replied to, one or more email items being forwarded, one or more links within one or more email items being selected, one or more emails being composed, one or more email items being displayed for longer than a threshold amount of time, etc. In a second example, the application may be a news application and/or the first list of content items may comprise a list of news items. Accordingly, the first activity may comprise one or more news items being selected, one or more news items being shared, one or more news items being displayed for longer than a threshold amount of time, etc.

At 406, the first activity may be analyzed to generate a first activity profile associated with the first content interface. Alternatively and/or additionally, the first activity profile may be associated with a first set of conditions. For example, the first activity may be performed at a time determined to meet the first set of conditions. The first set of conditions may comprise a first condition associated with the first client device and/or the first content interface. For example, the first activity profile may be associated with the first client device and/or the first content interface. For example, the first activity may be analyzed to generate the first activity profile based upon a determination that the first activity is performed using the first client device and/or the first content interface.

Alternatively and/or additionally, the first set of conditions may comprise a second condition associated with a first time of day. For example, the first activity profile may be associated with the first time of day. In some examples, the first activity may be performed during a first period of time, included in the first time of day. For example, the first activity may be analyzed to generate the first activity profile based upon a determination that the first activity is performed during the first time of day (e.g., early morning (5:00 AM-8:00 AM), morning (8:00 AM-11:00 AM), noon (11:00 AM-1:00 PM), afternoon (1:00 PM-5:00 PM), early evening (5:00 PM-7:00 PM), evening (7:00 PM-11:00 PM), late night (11:00 PM-5:00 AM), etc.).

Alternatively and/or additionally, the first set of conditions may comprise a third condition associated with a first set of weather characteristics. For example, the first activity profile may be associated with the first set of weather characteristics. In some examples, the first activity may be performed while the first client device is in a region determined to have the first set of weather characteristics. For example, the first activity may be analyzed to generate the first activity profile based upon a determination that the first activity is performed while the first client device is in a region having the first set of weather characteristics (e.g., rainy, sunny, cloudy, snowy, cold, warm, windy, etc.).

Alternatively and/or additionally, the first set of conditions may comprise a fourth condition associated with a first area (e.g., location). For example, the first activity profile may be associated with the first area. In some examples, the first activity may be performed while the first client device is located within the first area. For example, the first activity may be analyzed to generate the first activity profile based upon a determination that the first activity is performed while the first client device is located within the first area (e.g., the first area may be determined to be a workplace and/or an office of the user, the first area may be determined to be a home of the user, the first area may be determined to be a shopping center, the first area may be determined to be a park, the first area may be determined to be outside of the workplace and/or the office of the user, the first area may be determined to be outside of the home of the user, etc.).

In some examples, the first activity profile may comprise indications of one or more first types of content associated with the first activity. For example, the one or more first types of content may correspond to one or more first topics (e.g., subject matter) of the first set of activity items (e.g., associated with the first activity). In some examples, the one or more first types of content may be included in the first activity profile responsive to a determination that each type of content of the one or more first types of content is associated with a level of activity greater than a threshold level of activity. Alternatively and/or additionally, the first activity profile may comprise indications of one or more first types of activity associated with the first activity.

In the first example (where the application is an email application), the one or more first types of content may correspond to one or more email topics (e.g., work-related email items, promotional email items, current events email items, social email items, etc.) associated with the first activity. Alternatively and/or additionally, the one or more first types of activity may correspond to selections of the first user interface, email actions performed using the first client device (e.g., composing emails, replying to emails, forwarding of emails, etc.) and/or parts of email items that are displayed and/or consumed using the first client device (e.g., whether merely headers of email items are displayed and/or consumed, whether merely subject lines of email items are displayed and/or consumed, whether message bodies of email items are displayed and/or consumed, etc.).

In the second example (where the application is a news application), the one or more first topics may correspond to one or more news topics (e.g., international news, domestic news, business news, entertainment news, etc.) associated with the first activity. Alternatively and/or additionally, the one or more first types of activity may correspond to selections of the first content interface, actions performed using the first client device (e.g., sharing of news items, copying data from news items, etc.) and/or parts of news items that are displayed and/or consumed using the first client device (e.g., whether merely news article headlines are displayed and/or consumed, whether news article bodies are displayed and/or consumed, whether news videos are presented and/or consumed, etc.).

In some examples, the first activity profile may comprise indications of one or more first weights of the one or more first types of content associated with the first activity. For example, each type of content of the one or more first types of content may be assigned a weight of the one or more first weights. The one or more first weights of the one or more first types of content may be determined based upon amounts of activity associated with each type of content of the one or more first types of content.

For example, the one or more first weights may be determined based upon amounts of time associated with the one or more first types of content. For example, a first amount of time may be determined corresponding to a first type of content of the one or more first types of content. The first amount of time may be an amount of time that one or more content items associated with the first type of content are displayed, presented and/or consumed.

Alternatively and/or additionally, the one or more first weights may be determined based upon amounts of interactions associated with the one or more first types of content. For example, a first amount of interactions may be determined corresponding to the first type of content of the one or more first types of content. For example, the first amount of interactions may comprise an amount of selections (e.g., clicks, presses, etc.) corresponding to one or more content items associated with the first type of content and/or an amount of content items, associated the first type of content, that were presented.

In some examples, the first activity profile may comprise indications of one or more second weights of the one or more first types of activity associated with the first activity. For example, each type of activity of the one or more first types of activity may be assigned a weight of the one or more second weights. The one or more second weights of the one or more first types of activity may be determined based upon amounts of activity, of the first activity, associated with each type of activity of the one or more first types of activity.

In some examples, a second request to access the application may be received from a second client device of the plurality of devices (e.g., associated with the user account). At 408, a second graphical user interface of the second client device may be controlled to display a second content interface. In some examples, the second content interface may comprise a second set of content items of the content items database. In some examples, the second set of content items may be the same as the first set of content items. Alternatively and/or additionally, the second set of content items may be different than the first set of content items. Alternatively and/or additionally, the second set of content items may comprise one or more content items that are the same as the content items in the first set of content items and one or more content items that are different than the content items in the first set of content items.

In some examples, the second content interface may be a second version of the application, installed on the second client device. For example, software settings, one or more programming languages, etc. of the second content interface may be associated with an operating system of the second client device, a size of the second client device (e.g., a screen size of the second client device), etc. Alternatively and/or additionally, the second content interface may be a second web interface accessed via a browser of the second client device. Alternatively and/or additionally, the second content interface and/or the second client device may be associated with a second client device identification number, which may be used to identify the second client device and/or the second content interface.

In some examples, the second set of content items may be included in a second list of content items. For example, the second list of content items may comprise representations of the second set of content items. At 410, second activity performed using the second content interface may be detected. In some examples, the second activity may be associated with a second set of activity items of the second set of content items.

For example, the second activity may comprise one or more fourth content items of the second set of activity items being selected (e.g., clicked, pressed, etc.) using a second touchscreen (e.g., of the second client device), one or more second switches (e.g., one or more buttons), a second conversational interface, etc. Alternatively and/or additionally, the second activity may comprise one or more fifth content items of the second set of activity items being presented and/or consumed. Alternatively and/or additionally, the second activity may comprise one or more sixth content items of the second set of activity items undergoing a different type of activity.

At 412, the second activity may be analyzed to generate a second activity profile associated with the second content interface. Alternatively and/or additionally, the second activity profile may be associated with a second set of conditions. For example, the second activity may be performed at a time determined to meet the second set of conditions. The second set of conditions may comprise a fifth condition associated with the second client device and/or the second content interface. For example, the second activity profile may be associated with the second client device and/or the second content interface. For example, the second activity may be analyzed to generate the second activity profile based upon a determination that the second activity is performed using the second client device and/or the second content interface. In some examples, the second client device (e.g., a smartphone associated with the user) may be different than the first client device (e.g., a computer used at the workplace of the user).

Alternatively and/or additionally, the second set of conditions may comprise a sixth condition associated with a second time of day. For example, the second activity profile may be associated with the second time of day. In some examples, the second activity may be performed during a second period of time, included in the second time of day. For example, the second activity may be analyzed to generate the second activity profile based upon a determination that the second activity is performed during the second time of the day. In some examples, the second time of day (e.g., evening (7:00 PM-11:00 PM)) may be different than the first time of day (e.g., afternoon (1:00 PM-5:00 PM)). Alternatively and/or additionally, the second time of day may be the same as the first time of day.

Alternatively and/or additionally, the second set of conditions may comprise a seventh condition associated with a second set of weather characteristics. For example, the second activity profile may be associated with the second set of weather characteristics. In some examples, the second activity may be performed while the second client device is in a region determined to have the second set of weather characteristics. For example, the second activity may be analyzed to generate the second activity profile based upon a determination that the second activity is performed while the second client device is in a region having the second set of weather characteristics. In some examples, the second set of weather characteristics (e.g., cloudy) may be different than the first set of weather characteristics (e.g., sunny). Alternatively and/or additionally, the second set of weather characteristics may be the same as the first set of weather characteristics.

Alternatively and/or additionally, the second set of conditions may comprise an eighth condition associated with a second area. For example, the second activity profile may be associated with the second area. In some examples, the second activity may be performed while the second client device is located within the second area. For example, the second activity may be analyzed to generate the second activity profile based upon a determination that the second activity is performed while the second client device is located within the second area. In some examples, the second area (e.g., the home of the user) may be different than the first area (e.g., the workplace of the user). Alternatively and/or additionally, the second area may be the same as the first area.

In some examples, the second activity profile may comprise indications of one or more second types of content associated with the second activity. For example, the one or more second types of content may correspond to one or more second topics of the second set of activity items. In some examples, the one or more second types of content may be included in the second activity profile responsive to a determination that each type of content of the one or more second types of content is associated with a level of activity greater than the threshold level of activity. Alternatively and/or additionally, the first activity profile may comprise indications of one or more second types of activity associated with the second activity.

Alternatively and/or additionally, the second activity profile may comprise indications of one or more third weights of the one or more second types of content associated with the second activity. For example, each type of content of the one or more second types of content may be assigned a weight of the one or more third weights. The one or more third weights of the one or more second types of content may be determined based upon amounts of activity, of the second activity, associated with each type of content of the one or more second types of content.

Alternatively and/or additionally, the second activity profile may comprise indications of one or more fourth weights of the one or more second types of activity associated with the second activity. For example, each type of activity of the one or more second types of activity may be assigned a weight of the one or more fourth weights. The one or more fourth weights of the one or more second types of activity may be determined based upon amounts of activity, of the second activity, associated with each type of activity of the one or more second types of activity.

In some examples, the first activity profile and/or the second activity profile may be included in a plurality of activity profiles associated with the user account. For example, each activity profile of the plurality of activity profiles may be associated with a set of conditions of a plurality of sets of conditions. For example, each activity profile of the plurality of activity profiles may be associated with a client device, of a plurality of client devices associated with the user account. Alternatively and/or additionally, each activity profile of the plurality of activity profiles may be associated with a time of day, of a plurality of times of day. Alternatively and/or additionally, each activity profile of the plurality of activity profiles may be associated with a set of weather characteristics of a plurality of sets of weather characteristics. Alternatively and/or additionally, each activity profile of the plurality of activity profiles may be associated with an area (e.g., location) of a plurality of areas (e.g., locations).

At 414, a third request to access the application may be received from the first client device. At 416, the first activity profile may be selected from the plurality of activity profiles, based upon a determination that the third request is associated with the first content interface (e.g., and/or the first client device). For example, the third request may comprise the first client device identification number. Alternatively and/or additionally, the first activity profile may be selected form the plurality of activity profiles based upon a determination of the first set of conditions.

For example, the first activity profile may be selected from the plurality of activity profiles based upon a determination that the third request is received during a third period of time that is included in the first time of day. Alternatively and/or additionally, the first activity profile may be selected from the plurality of activity profiles based upon a determination that the third request is received while the first client device is in a region determined to have the first set of weather characteristics. Alternatively and/or additionally, the first activity profile may be selected from the plurality of activity profiles based upon a determination that the third request is received while the first client device is located within the first area.

At 418, content items of the content items database may be prioritized, based upon the first activity profile, to generate a third list of content items associated with the first content interface. For example, the prioritizing the content items of the content items database may be performed based upon the one or more first types of content. Alternatively and/or additionally, the prioritizing the content items of the content items database may be performed based upon the one or more first weights of the one or more first types of content such that the third list of content items has an order of content items associated with the one or more first weights of the one or more first types of content.

In the first example (where the application is an email application), the first activity profile may comprise an indication of a first type of content and/or an indication of a second type of content. For example, the first type of content may be work-related email items and/or the second type of content may be social email items. For example, the user may use the first client device (e.g., the computer used at the workplace of the user) to consume work-related email items and/or social email items (e.g., during the first time of day and/or while the user is at the workplace).

Alternatively and/or additionally, the first activity profile may comprise an indication of a first weight corresponding to the first type of content (e.g., work-related email items) and/or an indication of a second weight corresponding to the second type of content (e.g., social email items). In some examples, the first weight may be greater than the second weight. For example, during the first time of day and/or while the user is at the workplace, an amount of work-related email items consumed by the user, using the first client device, may be greater than an amount of social email items consumed by the user, using the first client device.

Accordingly, the content items of the content items database may be prioritized such that the third list of content items may comprise content items associated with the first type of content (e.g., work-related email items) preceding (e.g., above, before, etc.) content items associated with the second type of content (e.g., social email items). Alternatively and/or additionally, the content items of the content items database may be prioritized such that the third list of content items may comprise content items associated with the second type of content (e.g., social email items) preceding content items, of the content items database, associated with other types of content.

In the second example (where the application is a news application), the first type of content may be business news and/or the second type of content may be international news. For example, the user may use the first client device to consume business news items and/or international news items (e.g., during the first time of day and/or while the user is at the workplace). Alternatively and/or additionally, the first weight (e.g., corresponding to the business news) may be greater than the second weight (e.g., corresponding to the international news).

Accordingly, the content items of the content items database may be prioritized such that the third list of content items may comprise content items associated with the first type of content (e.g., business news) preceding content items associated with the second type of content (e.g., international new). Alternatively and/or additionally, the content items of the content items database may be prioritized such that the third list of content items may comprise content items associated with the second type of content (e.g., business news) preceding content items, of the content items database, associated with other types of content.

At 420, the first graphical user interface may be controlled to display the first content interface comprising the third list of content items. In some examples, a format of the first content interface may be configured based upon the first activity profile. For example, the format of the first content interface may be configured based upon the one or more first types of activity and/or the one or more second weights associated with the one or more first types of activity.

In the first example (where the application is an email application), the first activity profile may comprise an indication of a first type of activity. For example, the first type of activity may comprise message bodies of email items being displayed and/or consumed (e.g., rather than merely subject lines of email items being displayed and/or consumed). The format of the first content interface may be configured such that message bodies of email items are displayed (e.g., automatically). For example, the first content interface may display a first message body of a first email item of the third list of content items. The first content interface may comprise a first selectable input corresponding to displaying a second message body of a second email item of the third list of content items and/or a second selectable input corresponding to displaying the third list of content items.

Alternatively and/or additionally, the first activity profile may comprise an indication of a second type of activity. The second type of activity may comprise forwarding email items. The format of the first content interface may be configured such that a third selectable input corresponding to forwarding email items may be larger and/or a different color than if the first activity profile did not comprise the indication of the second type of activity.

In some examples, a fourth request to access the application may be received from the second client device. The second activity profile may be selected from the plurality of activity profiles, based upon a determination that the fourth request is associated with the second content interface (e.g., and/or the second device). For example, the fourth request may comprise the second user identification number. Alternatively and/or additionally, the second activity profile may be selected from the plurality of activity profiles based upon a determination of the second set of conditions (e.g., that the fourth request is received during a fourth period of time that is included in the second time of day, that the fourth request is received while the second client device is in a region determined to have the second set of weather characteristics and/or that the fourth request is received while the second client device is located within the second area).

Content items of the content items database may be prioritized, based upon the second activity profile, to generate a fourth list of content items associated with the second content interface. For example, the prioritizing the content items of the content items database may be performed based upon the one or more second types of content. Alternatively and/or additionally, the prioritizing the content items of the content items database may be performed based upon the one or more third weights of the one or more second types of content such that the fourth list of content items has an order of content items associated with the one or more third weights of the one or more second types of content.

The second graphical user interface may be controlled to display the second content interface comprising the fourth list of content items. In some examples, a format of the second content interface may be configured based upon the second activity profile. For example, the format of the second content interface may be configured based upon the one or more second types of activity and/or the one or more fourth weights associated with the one or more second types of activity.

In some examples, third activity performed using the first content interface may be detected. In some examples, the third activity may be analyzed to generate a third activity profile associated with the first content interface. Alternatively and/or additionally, the third activity profile may be associated with a third set of conditions. For example, the third activity may be performed at a time determined to meet the third set of conditions. The third set of conditions may comprise a ninth condition associated with the first client device and/or the first content interface. For example, the third activity profile may be associated with the first client device and/or the first content interface. For example, the third activity may be analyzed to generate the third activity profile based upon a determination that the third activity is performed using the first client device and/or the first content interface.

Alternatively and/or additionally, the third set of conditions may comprise a tenth condition associated with a third time of day. For example, the third activity profile may be associated with the third time of day. In some examples, the third activity may be performed during a sixth period of time, included in the third time of day. For example, the third activity may be analyzed to generate the third activity profile based upon a determination that the third activity is performed during the third time of the day. In some examples, the third time of day may be different than the first time of day. Alternatively and/or additionally, the third time of day may be the same as the first time of day.

Alternatively and/or additionally, the third set of conditions may comprise an eleventh condition associated with a third set of weather characteristics. For example, the third activity profile may be associated with the third set of weather characteristics. In some examples, the third activity may be performed while the first client device is in a region determined to have the third set of weather characteristics. For example, the third activity may be analyzed to generate the third activity profile based upon a determination that the third activity is performed while the third client device is in a region having the third set of weather characteristics. In some examples, the third set of weather characteristics may be different than the first set of weather characteristics. Alternatively and/or additionally, the third set of weather characteristics may be the same as the first set of weather characteristics.

Alternatively and/or additionally, the third set of conditions may comprise a twelfth condition associated with a third area. For example, the third activity profile may be associated with the third area. In some examples, the third activity may be performed while the first client device is located within the third area. For example, the third activity may be analyzed to generate the third activity profile based upon a determination that the third activity is performed while the first client device is located within the third area. In some examples, the third area may be different than the first area. Alternatively and/or additionally, the second area may be the same as the first area.

In some examples, a fifth request to access the application may be received from the first client device. The third activity profile may be selected from the plurality of activity profiles, based upon a determination of the third set of conditions (e.g., that the fifth request is received from the first client device, that the fifth request is received during a seventh period of time that is included in the third time of day, that the fifth request is received while the first client device is in a region determined to have the third set of weather characteristics and/or that the fifth request is received while the first client device is located within the third area).

Content items of the content items database may be prioritized, based upon the third activity profile, to generate a fifth list of content items associated with the first content interface, the third time of day, the third set of weather characteristics and/or the third area. The first graphical user interface may be controlled to display the first content interface comprising the fifth list of content items.

Figure 4B:
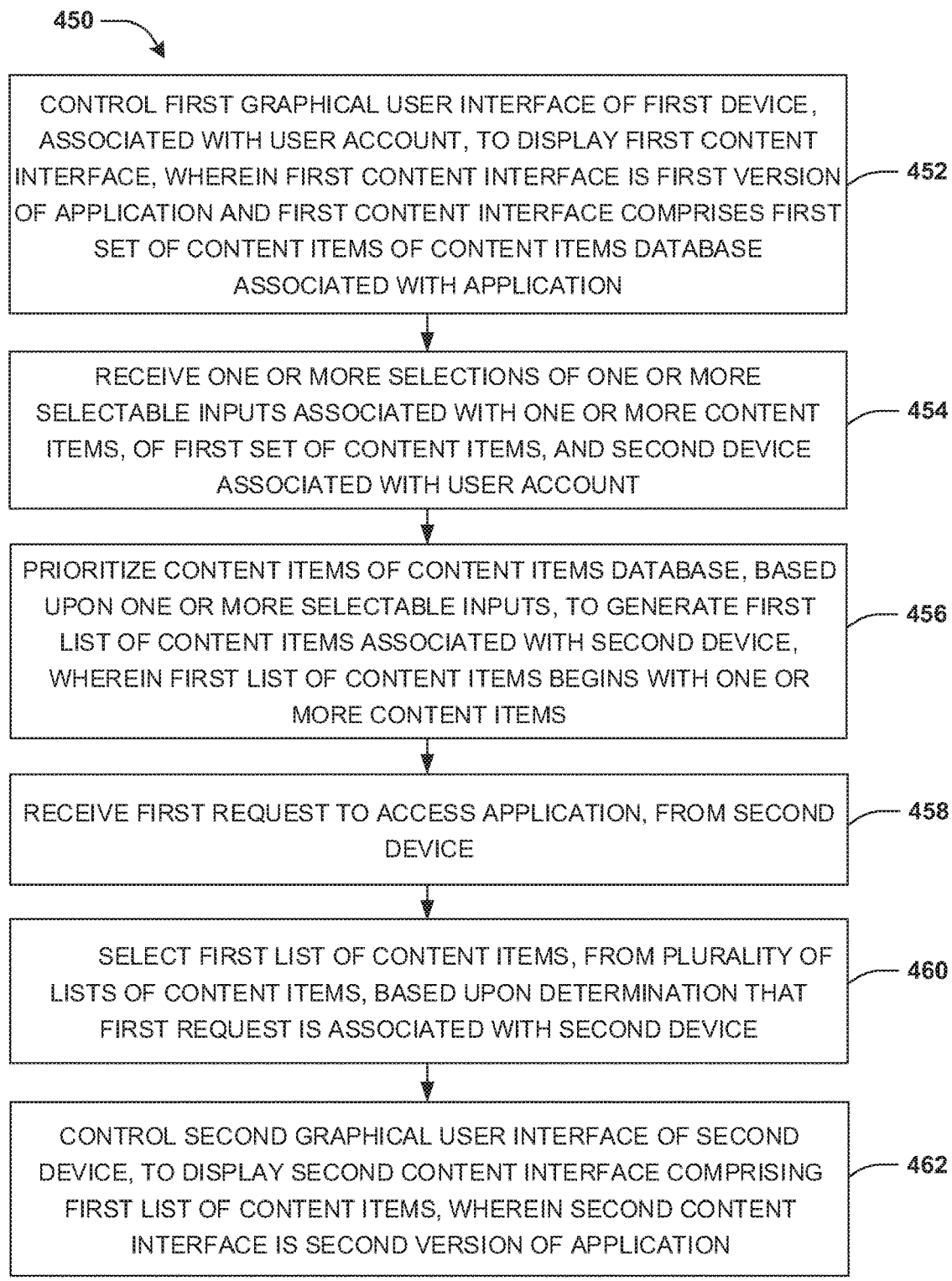
FIG. 4B is a flow chart illustrating an example method for presenting content of an application.

An embodiment of presenting content of an application is illustrated by an example method 450 of FIG. 4B. A user, such as user James, (e.g., and/or a client device associated with the user) may access and/or interact with an application for consuming content. In some examples, the application may be accessed and/or interacted with via a plurality of devices associated with a user account of the user. For example, a first request to access the application may be received from a first client device of the plurality of devices (e.g., associated with the first client device). At 452, a first graphical user interface of the first client device may be controlled to display a first content interface. In some examples, the first content interface may comprise a first set of content items of a content items database associated with the application.

In some examples, the first content interface may be a first version of the application, installed on the first client device. Alternatively and/or additionally, the first content interface may be a first web interface accessed via a browser of the first client device. Alternatively and/or additionally, the first content interface and/or the first client device may be associated with a first client device identification number, which may be used to identify the first client device and/or the first content interface.

In some examples, the first client device may be a first type of client device. For example, the first type of client device may comprise a smartphone, a tablet, a client device with a screen-size smaller than a threshold size, etc. In some examples, it may be difficult for the user to consume content of the first set of content items, interact with the first content interface, perform actions using the first content interface, etc. (e.g., due to a screen-size of the first client device). Alternatively and/or additionally, the user may prefer consuming content items of the first set of content items, performing one or more actions associated with the content items, etc. using a second client device, associated with the user account. In some examples, the second client device may be a second type of client device. The second type of client device may be different than the first type of client device. Alternatively and/or additionally, the second type of client device may be the same as the first type of client device.

In a first example, the application may be a news application. In some examples, it may be difficult for the user to read a news article using the first client device due to a screen-size of the first client device (e.g., the first client device may be a smartphone). For example, the user may prefer reading the news article using the second client device (e.g., a desktop computer, a laptop computer and/or a tablet).

In a second example, the application may be an email application. In some examples, the user may not want to read a work-related email and/or perform email actions related to work-related emails using the first client device (e.g., the first client device may be a personal device). For example, the user may prefer reading work-related emails and/or performing email actions related to work-related emails using the second client device (e.g., a computer assigned to the user by a workplace of the user).

In some examples, the first set of content items may be included in a first list of content items. For example, the first list of content items may comprise representations of the first set of content items and/or a set of selectable inputs. In some examples, each selectable input of the set of selectable inputs may correspond to a content item of the first set of content items. In some examples, each selectable input of the set of selectable inputs may correspond to an option for using the second client device to present a content item of the first set of content items. Alternatively and/or additionally, each selectable input of the set of selectable inputs may correspond to an option for using a client device that is the second type of client device to present a content item of the first set of content items. For example, the second type of client device may correspond to a desktop computer, a laptop computer, a tablet, a smartphone, etc.

In some examples, each list item of the first list of content items may comprise a representation of a content item of the first set of content items and/or a selectable input, of the set of selectable inputs, corresponding to the content item. For example, a first list item may comprise a first content item of the first set of content items and/or a first selectable input of the set of selectable inputs, a second list item may comprise a second content item of the first set of content items and/or a second selectable input of the set of selectable inputs, etc.

Alternatively and/or additionally, a selection of a third content item of the first set of content items may be received (e.g., via the first list of content items). The third content item may be presented via the first content interface. A third selectable input, of the set of selectable inputs, may be displayed adjacent to (e.g., above, below, beside, etc.) and/or within the third content item.

At 454, one or more selections of one or more selectable inputs (of the set of selectable inputs) may be received. For example, the one or more selectable inputs may be associated with one or more content items, of the first set of content items. Alternatively and/or additionally, the one or more selectable inputs may be associated with the second client device. Alternatively and/or additionally, the one or more selectable inputs may be associated with the second type of client device. In some examples, responsive to receiving the one or more selections of the one or more selectable inputs, the one or more content items may be assigned to the second client device and/or the second type of client device.

Alternatively and/or additionally, responsive to receiving the one or more selections of the one or more selectable inputs, one or more notifications may be transmitted to the second client device. For example, the one or more notifications may comprise one or more links to the one or more content items. For example, a selection of a link of the one or more links may be received using the second client device. Responsive to receiving a selection of the link, a content item, associated with the link, may be presented using the second client device.

At 456, content items of the content items database may be prioritized, based upon the one or more selectable inputs, to generate a second list of content items associated with the second client device. Alternatively and/or additionally, the second list of content items may be associated with the second type of client device. The second list of content items may begin with the one or more content items. In some examples, a first format (e.g., a color, a size, a font, etc.) of one or more list items comprising the one or more content items may be different than a second format (e.g., a color, a size, a font, etc.) of other list items comprising content items (that are not the one or more content items).

At 458, a second request to access the application may be received from the second client device. At 460, the second list of content items may be selected from a plurality of lists of content items, based upon a determination that the second request is associated with the second client device. For example, the second request may comprise a second client device identification number. The second client device identification number may be used to identify the second client device.

Alternatively and/or additionally, the second list of content items may be selected from the plurality of lists of content items, based upon a determination that the second request is associated with the second type of client device. For example, responsive to a determination of one or more conditions, the second list of content items may be selected from the plurality of lists of content items. The one or more conditions may comprise that the second client device is the second type of client device (e.g., a smartphone, a laptop computer, etc.), that the second client device has a screen-size larger than or smaller than a second threshold size associated with the second type of client device, etc.

At 462, a second graphical user interface of the second client device may be controlled to display a second content interface comprising the second list of content items. The second content interface may be a second version of the application, installed on the second client device. Alternatively and/or additionally, the second content interface may be a second web interface accessed via a browser of the second client device.

In some examples, a third request to access the application may be received from a third client device (e.g., prior to the second request being received from the second client device). For example, the third client device may be different than the second client device. Alternatively and/or additionally, the third client device may be the first type of client device and/or a third type of client device (e.g., different than the second type of client device). A third list of content items may be selected from the plurality of lists of content items, based upon a determination that the third request is associated with the third client device. The third list of content items may be different than the second list of content items (e.g., associated with the second client device and/or the second type of client device).

FIGS. 5A-5H illustrate examples of a system 501 for presenting content of an application. A user 502, such as user Jack, (e.g., and/or a first client device 500 associated with the user) may access and/or interact with an application for consuming content. For example, the application may be an email application and/or the content may comprise email items. In some examples, the application may be accessed and/or interacted with via a plurality of devices associated with a user account of the user 502.

For example, a first graphical user interface of the first client device 500 may be controlled to display a first content interface. In some examples, the first content interface may be a first version of the application, installed on the first client device 500. In some examples, the first content interface may comprise a first set of content items of a content items database associated with the application.

Figure 5A:
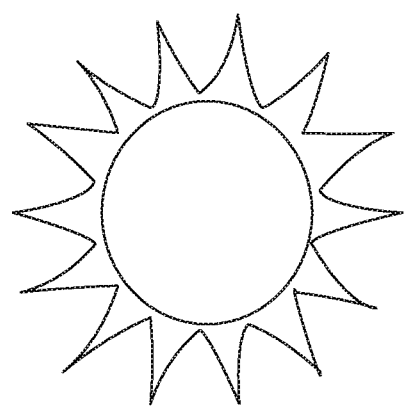
FIG. 5A is a component block diagram illustrating an example system for presenting content of an application, where first activity performed using a first content interface is detected.
Figure 5A:
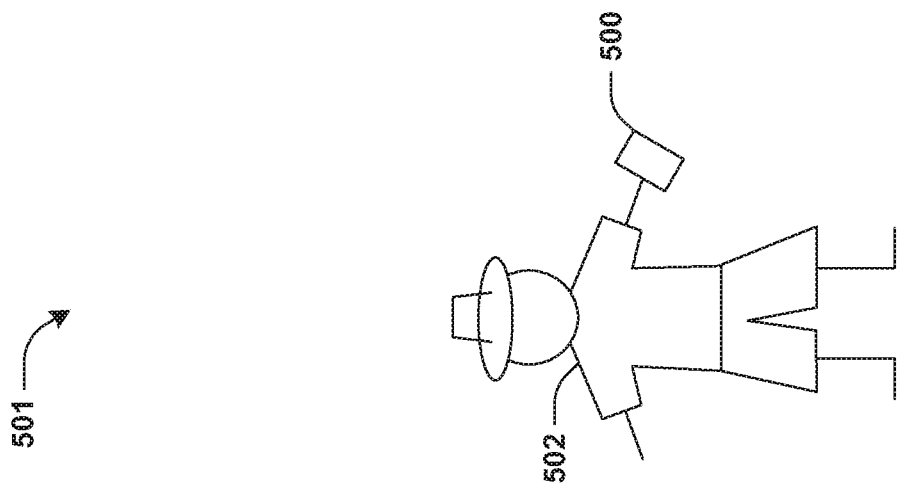

FIG. 5A illustrates first activity performed using the first content interface being detected. For example, the first activity may comprise one or more first content items of the first set of content items being selected using a first touchscreen (e.g., of the first client device 500), one or more first switches, a first conversational interface, etc. Alternatively and/or additionally, the first activity may comprise one or more second content items being presented and/or consumed. Alternatively and/or additionally, the first activity may comprise one or more third content items undergoing a different type of activity (e.g., being forwarded, being replied to, being marked as important, etc.).

In some examples, the first activity may be performed at a time determined to meet a first set of conditions. For example, the first activity may be performed during a first time of day (e.g., early evening (5:00 PM-7:00 PM)). Alternatively and/or additionally, the first activity may be performed while the first client device 500 is in a region determined to have a first set of weather characteristics (e.g., sunny and/or warm). Alternatively and/or additionally, the first activity may be performed while the first client device is located within a first area (e.g., an outdoor shopping center).

In some examples, the first activity may be analyzed to generate a first activity profile associated with the first content interface, the first time of day, the first set of weather characteristics and/or the first area. The first activity profile may comprise indications of one or more first types of content (e.g., one or more first topics) associated with the first activity. Alternatively and/or additionally, the first activity profile may comprise indications of one or more first types of activity associated with the first activity.

For example, a first type of content of the one or more first types of content may correspond to promotional email items (e.g., the user 502 may use the first client device 500 to consume promotional email items while at the outdoor shopping center). Alternatively and/or additionally, a second type of content of the one or more first types of content may correspond to social email items (e.g., the user 502 may use the first client device 500 to consume social email items during the first time of day).

In some examples, one or more first weights may be assigned to each type of content of the one or more first types of content, based upon amounts of activity associated with each type of content of the one or more first types of content. In some examples, a first weight assigned to the first type of content (e.g., promotional email items) may be greater than a second weight assigned to the second type of content (e.g., social email items).

Figure 5B:
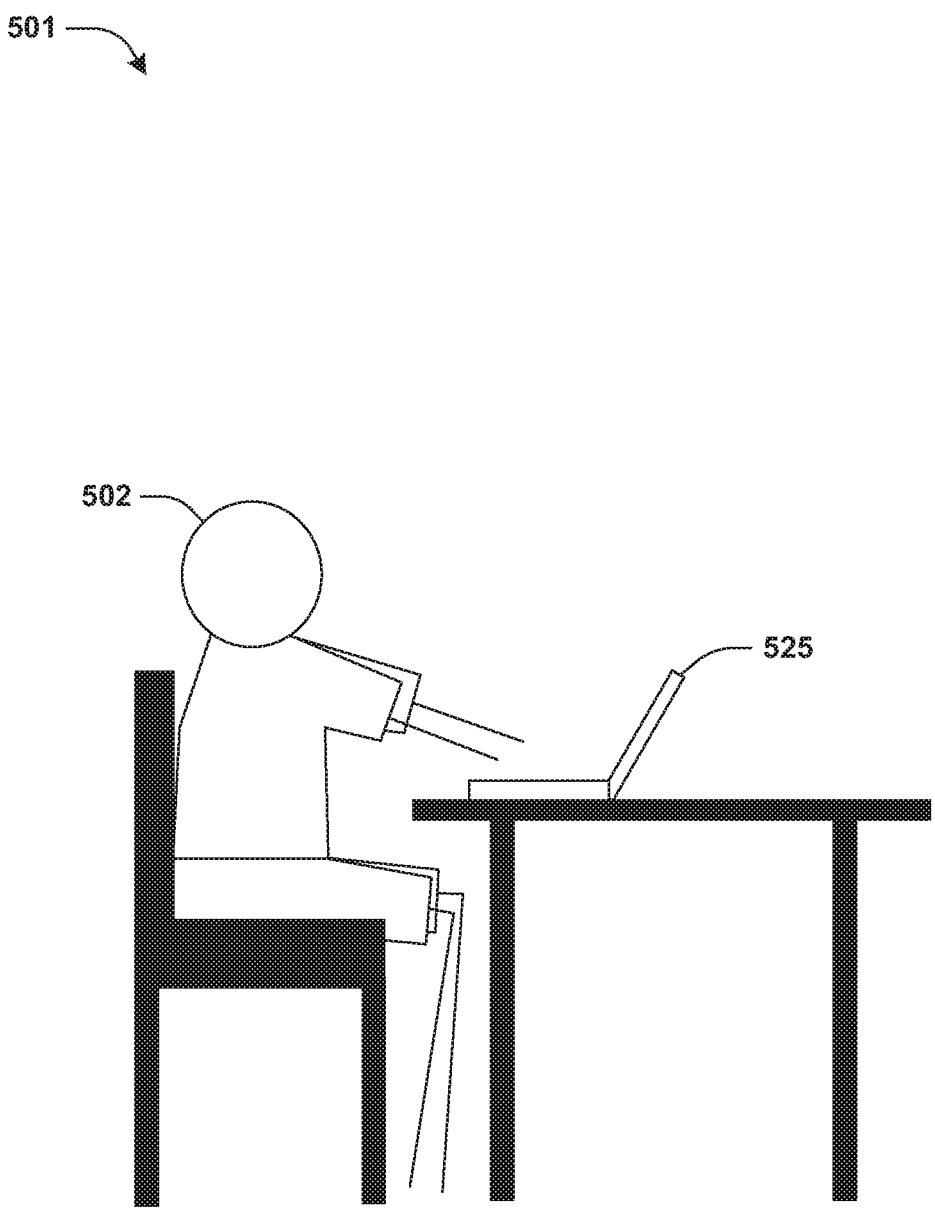
FIG. 5B is a component block diagram illustrating an example system for presenting content of an application, where second activity performed using a second content interface is detected.

FIG. 5B illustrates second activity performed using a second content interface being detected. For example, a second graphical user interface of a second client device 525 may be controlled to display the second content interface. The second client device 525 may be associated with the user account of the user 502. In some examples, the second content interface may be a second version of the application, installed on the second client device 525. In some examples, the second content interface may comprise a second set of content items of the content items database. In some examples, the second set of content items may be the same as the first set of content items. Alternatively and/or additionally, the second set of content items may be different than the first set of content items.

For example, the second activity may comprise one or more fourth content items of the second set of content items being selected using a second touchscreen (e.g., of the second client device 525), one or more second switches (e.g., a keyboard), a second conversational interface, etc. Alternatively and/or additionally, the second activity may comprise one or more fifth content items being consumed. Alternatively and/or additionally, the second activity may comprise one or more sixth content items undergoing a different type of activity (e.g., being forwarded, being replied to, being marked as important, etc.).

In some examples, the second activity may be performed at a time determined to meet a second set of conditions. For example, the second activity may be performed during a second time of day (e.g., afternoon (1:00 PM-5:00 PM)). Alternatively and/or additionally, the second activity may be performed while the second client device 525 is in a region determined to have a second set of weather characteristics (e.g., cloudy). Alternatively and/or additionally, the second activity may be performed while the second client device is located within a second area (e.g., at a workplace associated with the user 502).

In some examples, the second activity may be analyzed to generate a second activity profile associated with the second content interface, the second time of day, the second set of weather characteristics and/or the second area. The second activity profile may comprise indications of one or more second types of content (e.g., one or more second topics) associated with the second activity. Alternatively and/or additionally, the second activity profile may comprise indications of one or more second types of activity associated with the second activity. For example, a third type of content of the one or more second types of content may correspond to work-related email items (e.g., the user 502 may use the second client device 525 to consume work-related email items and/or perform work-related email actions while at the workplace).

Figure 5C:
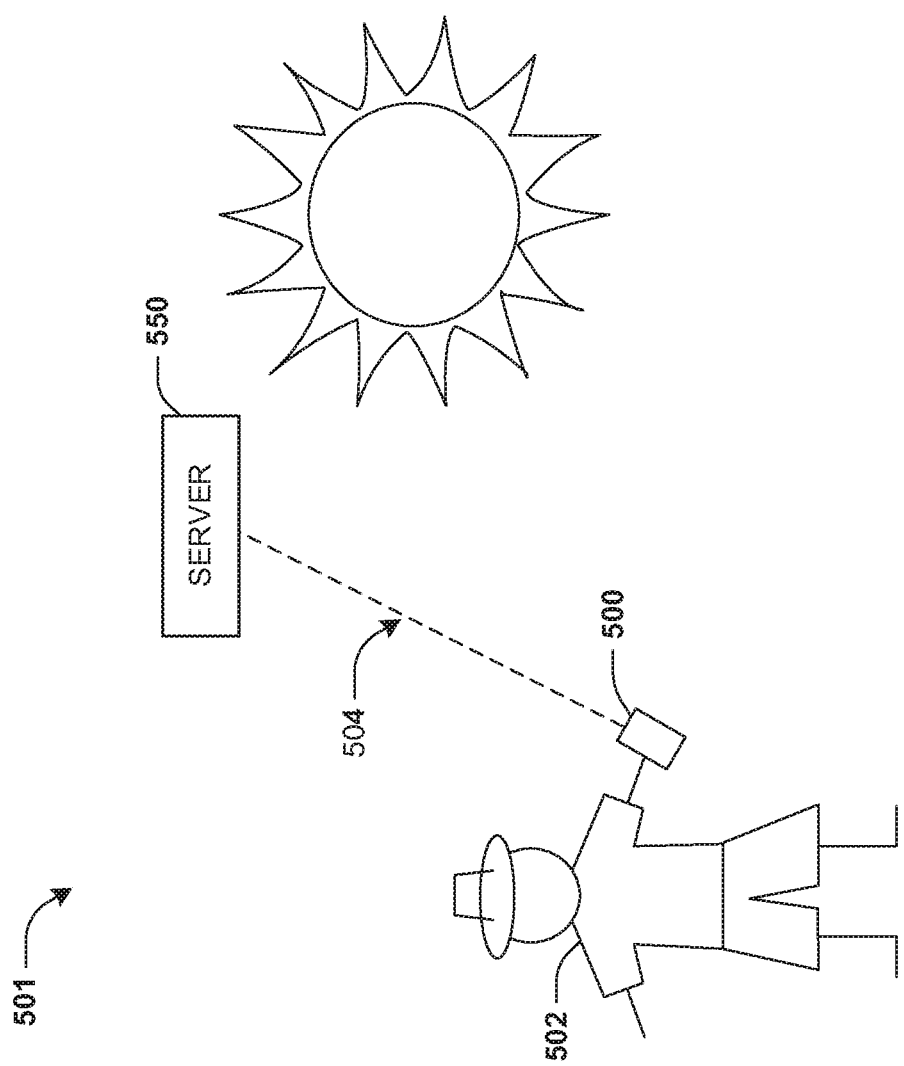
FIG. 5C is a component block diagram illustrating an example system for presenting content of an application, where a first request to access the application is received by a server.

FIG. 5C illustrates a first request 504 to access the application being received, by a server 550, from the first client device 500. For example, the first request 504 may be received during the first time of day, while the first client device 500 is in a region determined to have the first set of weather characteristics and/or while the first client device 500 is located within the first area.

Figure 5D:
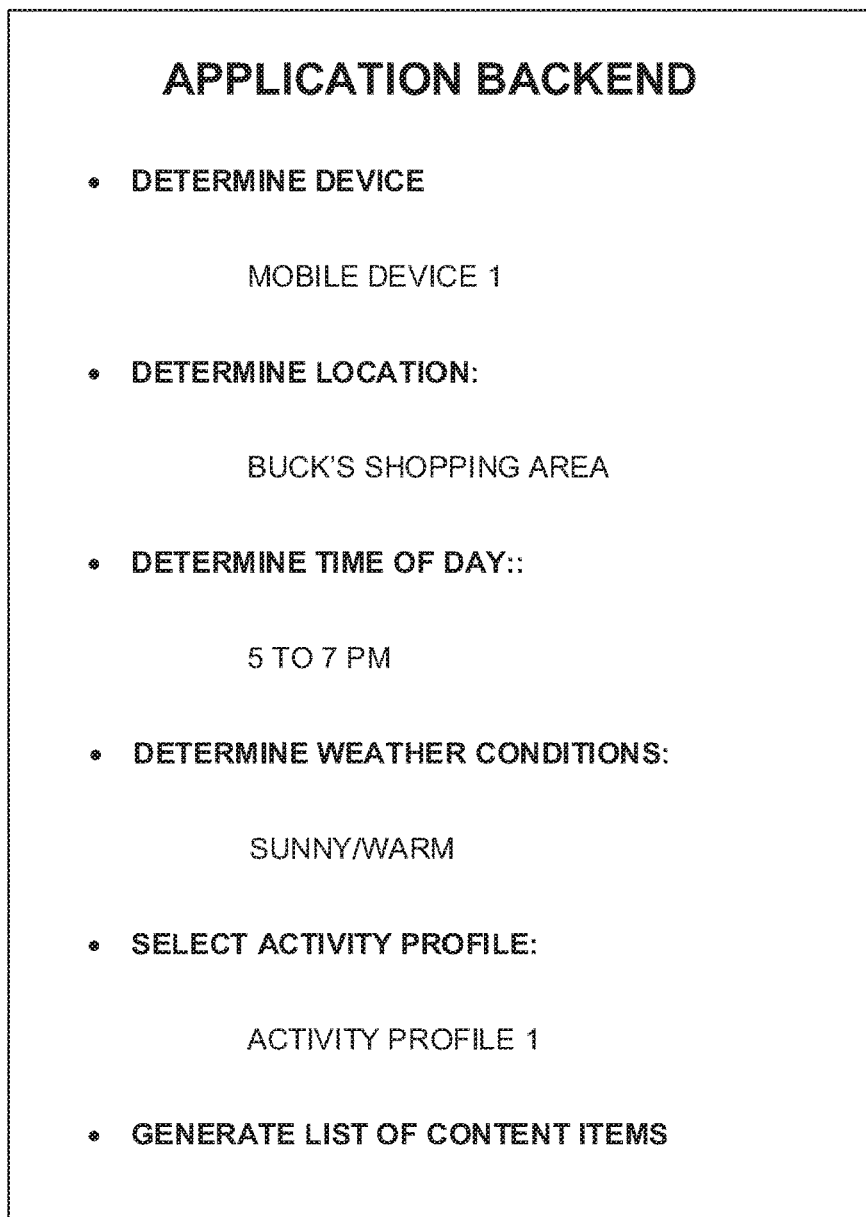
FIG. 5D is a component block diagram illustrating an example system for presenting content of an application, where a first activity profile is selected from a plurality of activity profiles.

FIG. 5D illustrates a backend system 575 selecting the first activity profile from a plurality of activity profiles. For example, the backend system 575 may determine that the first client device 500 (e.g., "MOBILE DEVICE 1") transmitted the first request 504 (e.g., based upon a first client device identification comprised within the first request 504). Alternatively and/or additionally, the backend system 575 may determine that the first client device 500 is located within the first area (e.g., "BUCK'S SHOPPING AREA") while the first request 504 is transmitted. Alternatively and/or additionally, the backend system 575 may determine that the first request 504 is received during the first time of day (e.g., "5 TO 7 PM"). Alternatively and/or additionally, the backend system 575 may determine that the first request 504 is received while the first client device 500 is in a region determined to have the first set of weather characteristics (e.g., "SUNNY/WARM").

The first activity profile (e.g., "ACTIVITY PROFILE 1") may be selected (by the backend system 575) from the plurality of activity profiles based upon a determination that the first request 504 is received from the first client device 500, that the first request 504 is received during the first time of day, that the first request 504 is received while the first client device 500 is in a region determined to have the first set of weather characteristics and/or that the first request 504 is received while the first client device 500 is located within the first area. Content items of the content items database may be prioritized, based upon the first activity profile, to generate a first list of content items associated with the first content interface and/or the first client device 500.

Figure 5E:
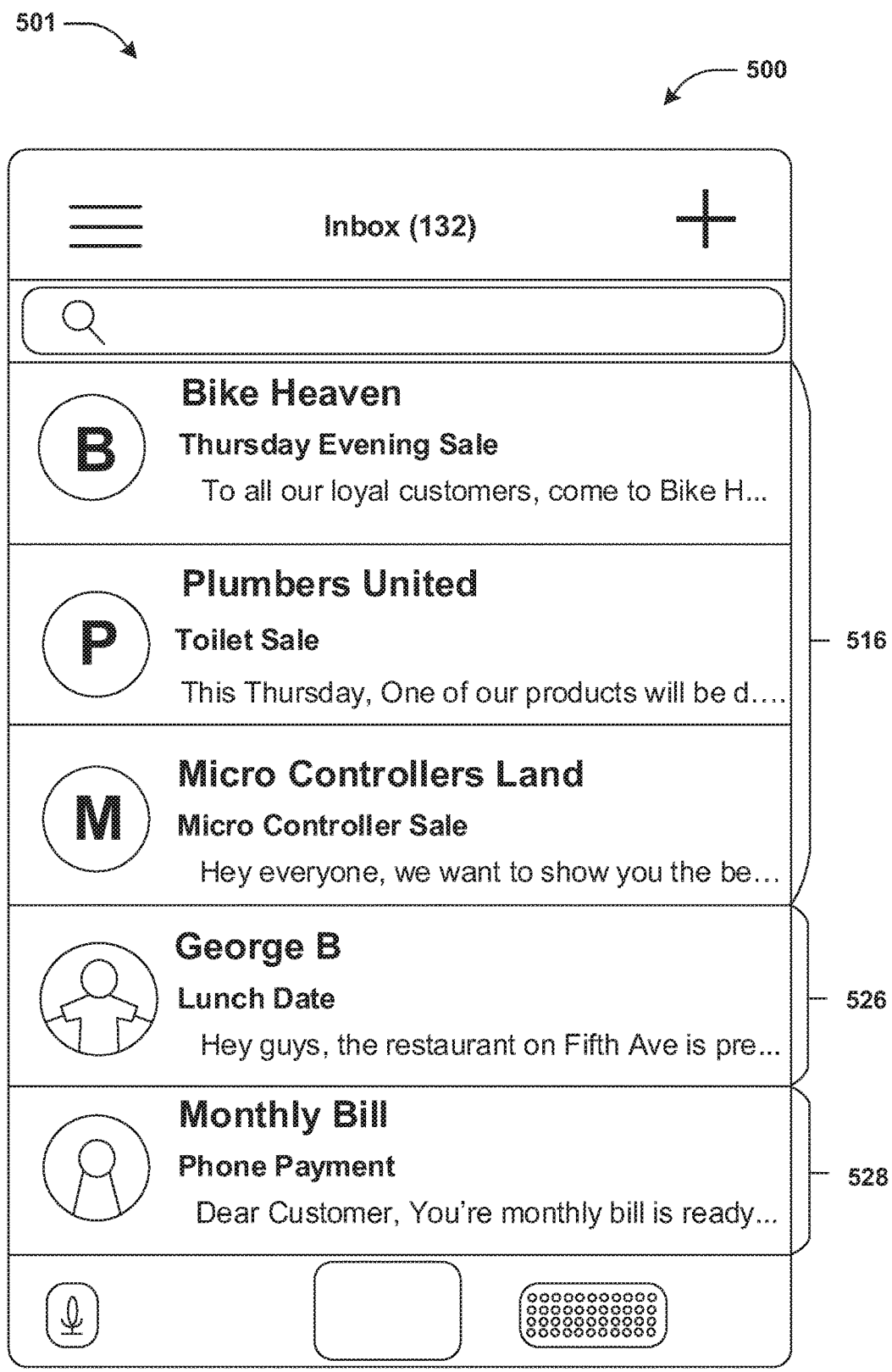
FIG. 5E is a component block diagram illustrating an example system for presenting content of an application, where a first graphical user interface of a first client device is controlled to display a first content interface.

FIG. 5E illustrates the first graphical user interface of the first client device 500 being controlled to display the first content interface. For example, the first content interface may comprise the first list of content items. In some examples, the content items of the content items database may be prioritized such that, within the first list of content items, a third set of content items 516 associated with the first type of content (e.g., promotional email items) precedes a fourth set of content items 526 associated with the second type of content (e.g., social email items) based upon the first weight of the first type of content being greater than the second weight of the second type of content. Alternatively and/or additionally, the content items of the content items database may be prioritized such that, within the first list of content items, the fourth set of content items 526 precedes a fifth set of content items 528 associated with other types of content that are not indicated by the first activity profile.

Figure 5F:
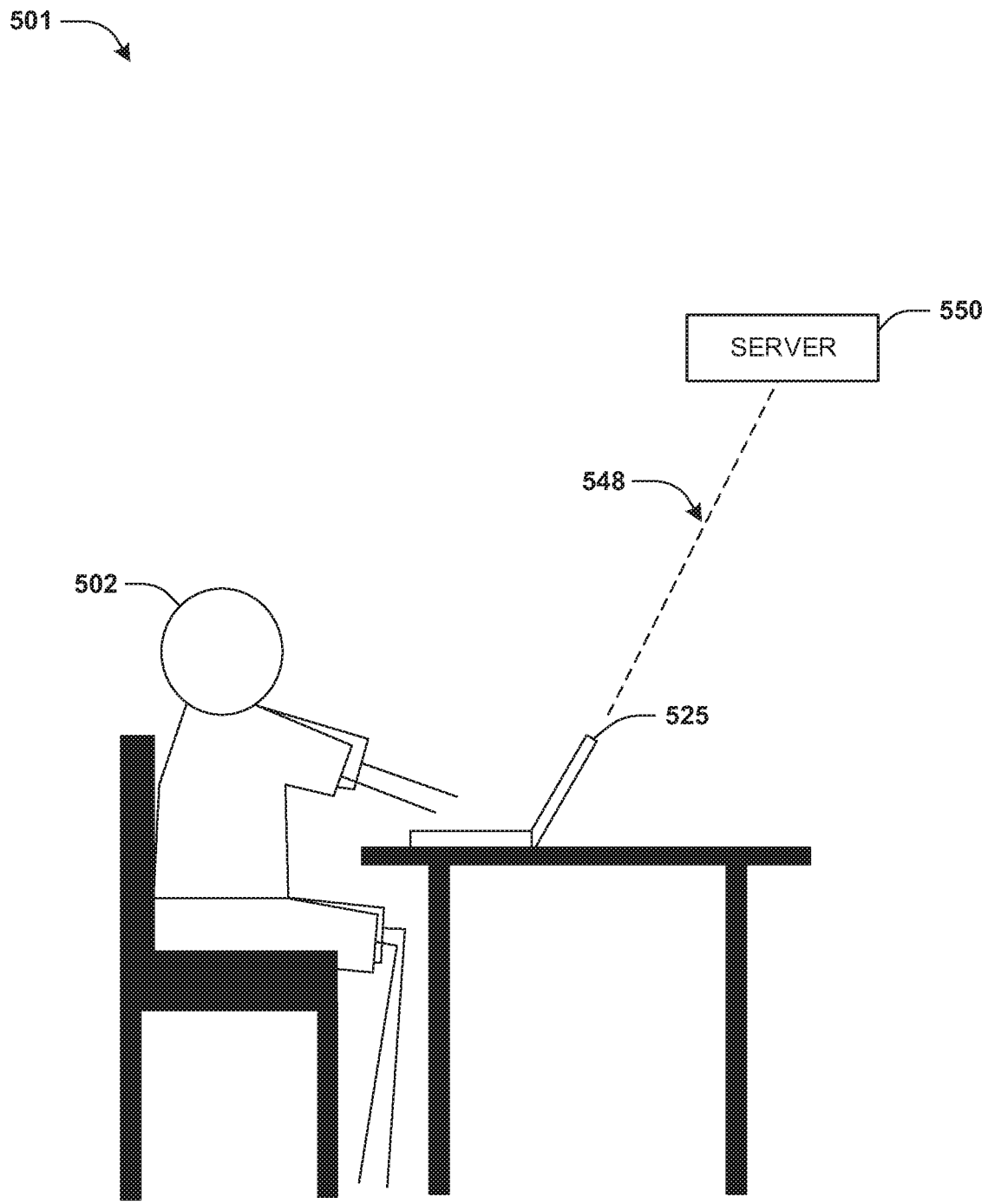
FIG. 5F is a component block diagram illustrating an example system for presenting content of an application, where a second request to access the application is received by a server.

FIG. 5F illustrates a second request 548 to access the application being received, by the server 550 (e.g., and/or a different server), from the second client device 525. For example, the second request 548 may be received during the second time of day, while the second client device 525 is in a region determined to have the second set of weather characteristics and/or while the second client device 525 is located within the second area.

FIG. 5G illustrates the backend system 575 selecting the second activity profile from the plurality of activity profiles. For example, the backend system 575 may determine that the second client device 525 (e.g., "DESKTOP COMPUTER 1") transmitted the second request 548 (e.g., based upon a second client device identification comprised within the second request 548). Alternatively and/or additionally, the backend system 575 may determine that the second client device 525 is located within the second area (e.g., "WORKPLACE") while the second request 548 is transmitted. Alternatively and/or additionally, the backend system 575 may determine that the second request 548 is received during the second time of day (e.g., "1 TO 5 PM"). Alternatively and/or additionally, the backend system 575 may determine that the second request 548 is received while the second client device 525 is in a region determined to have the second set of weather characteristics (e.g., "CLOUDY").

The second activity profile (e.g., "ACTIVITY PROFILE 2") may be selected (by the backend system 575) from the plurality of activity profiles based upon a determination that the second request 548 is received from the second client device 525, that the second request 548 is received during the second time of day, that the second request 548 is received while the second client device 525 is in a region determined to have the second set of weather characteristics and/or that the second request 548 is received while the second client device 525 is located within the second area. Content items of the content items database may be prioritized, based upon the second activity profile, to generate a second list of content items associated with the second content interface and/or the second client device 525.

Figure 5H:
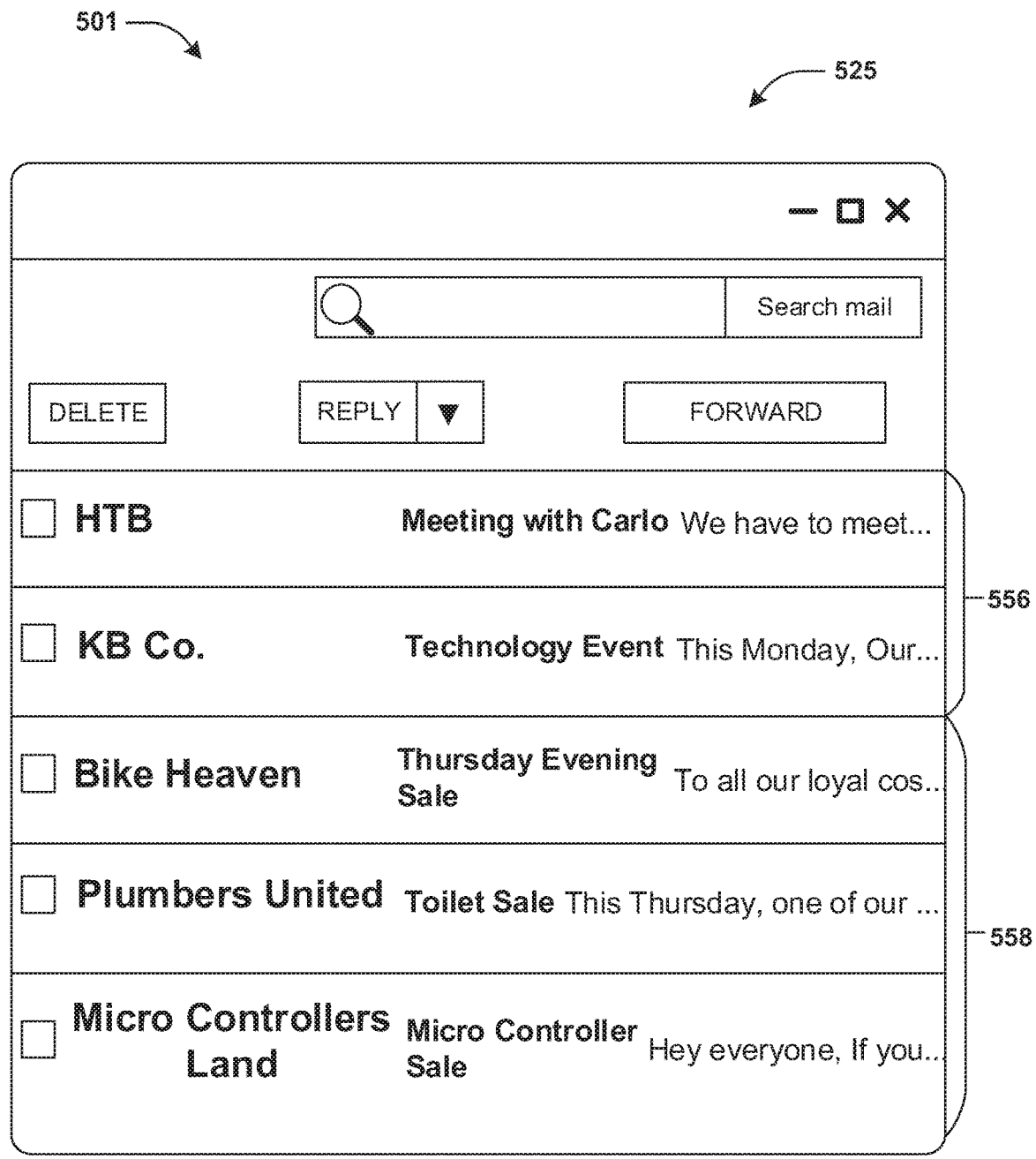
FIG. 5H is a component block diagram illustrating an example system for presenting content of an application, where a second graphical user interface of a second client device is controlled to display a second content interface.

FIG. 5H illustrates the second graphical user interface of the second client device 525 being controlled to display the second content interface. For example, the second content interface may comprise the second list of content items. In some examples, the content items of the content items database may be prioritized such that, within the second list of content items, a sixth set of content items 556 associated with the third type of content (e.g., work-related email items) precedes a seventh set of content items 558 associated with other types of content that are not indicated by the second activity profile.

Figure 6A:
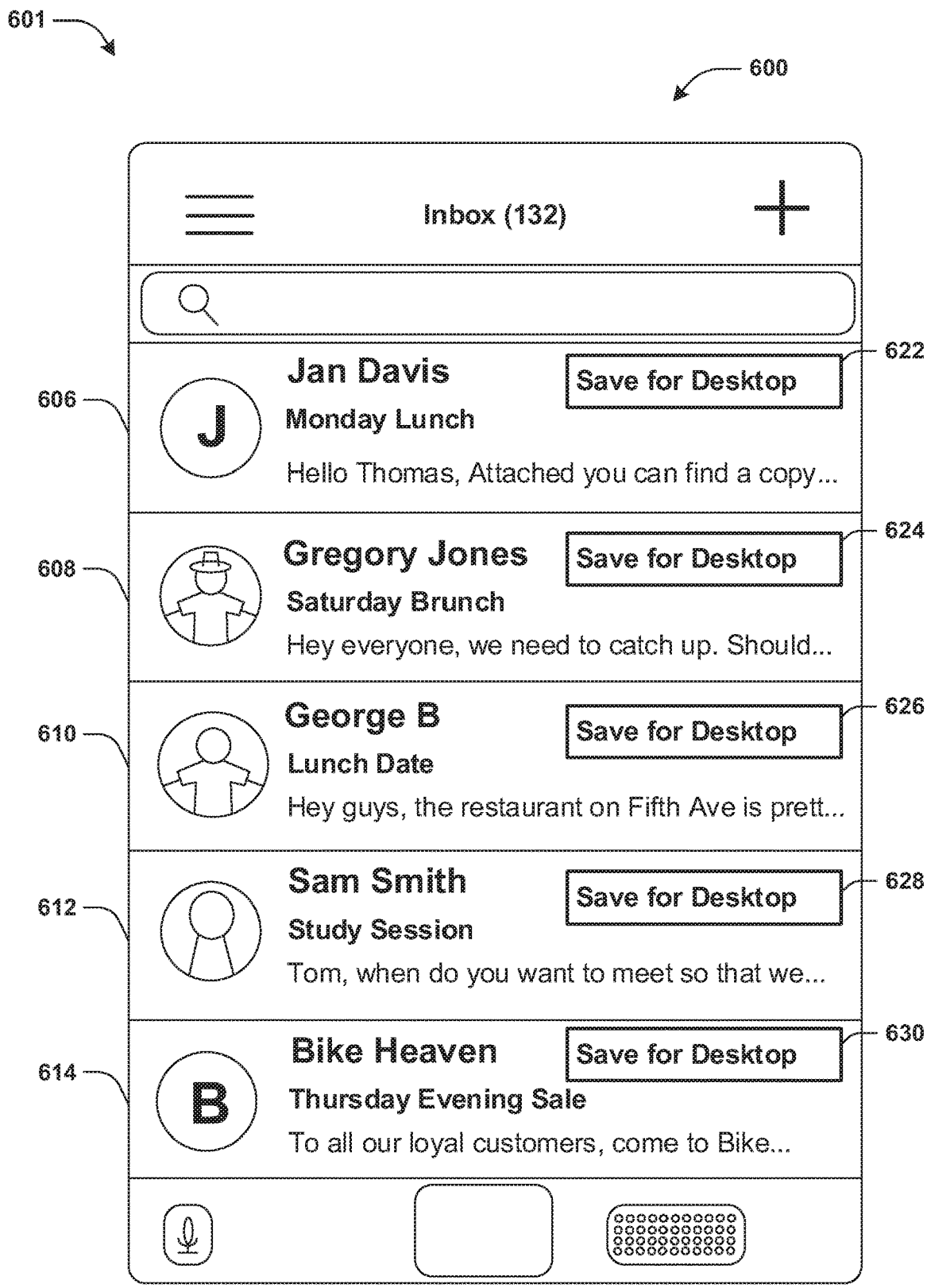
FIG. 6A is a component block diagram illustrating an example system for presenting content of an application, where a first graphical user interface of a first client device is controlled to display a first content interface.
Figure 6B:
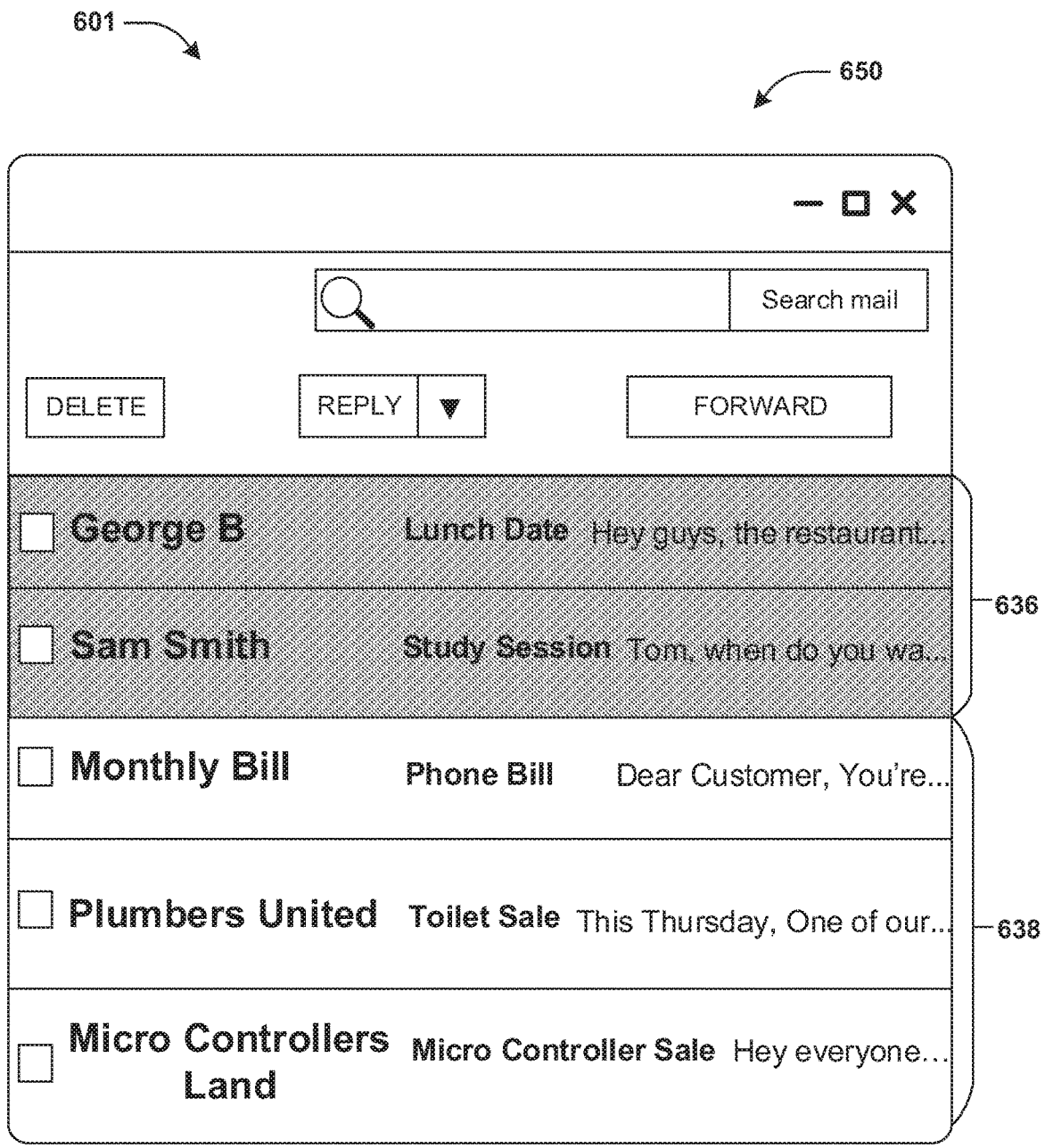
FIG. 6B is a component block diagram illustrating an example system for presenting content of an application, where a second graphical user interface of a second client device is controlled to display a second content interface.

FIGS. 6A-6B illustrate examples of a system 501 for presenting content of an application. A user, such as user Jessica, (e.g., and/or a client device 600 associated with the user) may access and/or interact with an application for consuming content. For example, the application may be an email application and/or the content may comprise email items. In some examples, the application may be accessed and/or interacted with via a plurality of devices associated with a user account of the user.

FIG. 6A illustrates a first graphical user interface of the first client device 600 being controlled to display a first content interface. In some examples, the first content interface may comprise a first set of content items. For example, the first set of content items may be included in a first list of content items. For example, the first list of content items may comprise representations of the first set of content items and/or a set of selectable inputs. In some examples, each selectable input of the set of selectable inputs may correspond to a content item of the first set of content items.

For example, a first list item 606 of the first list of content items may comprise a representation of a first content item and/or a first selectable input 622 (of the set of selectable inputs) associated with the first content item. Alternatively and/or additionally, a second list item 608 of the first list of content items may comprise a representation of a second content item and/or a second selectable input 624 (of the set of selectable inputs) associated with the second content item. Alternatively and/or additionally, a third list item 610 of the first list of content items may comprise a representation of a third content item and/or a third selectable input 626 (of the set of selectable inputs) associated with the third content item. Alternatively and/or additionally, a fourth list item 612 of the first list of content items may comprise a representation of a fourth content item and/or a fourth selectable input 628 (of the set of selectable inputs) associated with the fourth content item. Alternatively and/or additionally, a fifth list item 614 of the first list of content items may comprise a representation of a fifth content item and/or a fifth selectable input 630 (of the set of selectable inputs) associated with the fifth content item.

In some examples, each selectable input (e.g., "Save for Desktop") of the set of selectable inputs may correspond to an option for using a second client device 650 to present a content item of the first set of content items. For example, the first client device 600 may be a first type of client device. Alternatively and/or additionally, the second client device 650 may be a second type of client device. The first type of client device may be the same as the second type of client device. Alternatively and/or additionally, the first type of client device may be different than the second type of client device. For example, the first client device 600 may be a smartphone and/or the second client device 650 may be a desktop computer.

In some examples, one or more selections of one or more selectable inputs of the set of selectable inputs may be received. For example, a first selection of the third selectable input 626, corresponding to the third content item, may be received. Alternatively and/or additionally, a second selection of the fourth selectable input 628, corresponding to the fourth content item, may be received. In some examples, responsive to receiving the first selection of the third selectable input 626 and/or the second selection of the fourth selectable input 628, the third content item and/or the fourth content item may be assigned to the second client device 650.

In some examples, content items of the content items database may be prioritized, based upon the third selectable input 626 and/or the fourth selectable input 628, to generate a second list of content items associated with the second client device 650. FIG. 6B illustrates a second graphical user interface of the second client device 650 being controlled to display a second content interface. In some examples, the second content interface may comprise the second list of content items. The second list of content items may begin with a first set of list items 636 corresponding to the third content item and/or the fourth content item. In some examples, a first format (e.g., a color, a size, a font, etc.) of the first set of list items 636 may be different than a second format (e.g., a color, a size, a font, etc.) of a second set of list items 638 comprising other content items of the content items database.

It may be appreciated that the disclosed subject matter may assist a user (e.g., and/or one or more client devices associated with the user) in consuming preferred content using a first client device without needing to scroll past content that the user does not intend to consume using the first client device.

Implementation of at least some of the disclosed subject matter may lead to benefits including, but not limited to, a reduction in screen space and/or an improved usability of a display (e.g., of one or more client devices) (e.g., as a result of detecting first activity performed using the first client device, as a result of generating a first activity profile associated with a first set of conditions based upon the first activity, as a result of detecting second activity performed using a second client device, as a result of generating a second activity profile associated with a second set of conditions based upon the second activity, as a result of using the first client device to present content associated with the first activity profile, as a result of using the second client device to present content associated with the second activity profile, etc.).

Alternatively and/or additionally, implementation of at least some of the disclosed subject matter may lead to benefits including more accurate and precise transmission of content to the one or more client devices (e.g., as a result of determining one or more types of content associated with the first activity performed using the first device, as a result of assigning weights to the one or more types of content based upon amounts of activity associated with each type of content of the one or more types of content, as a result of prioritizing content items of a content items database based upon the one or more types of content and the weights to generate a list of content items associated with the first client device, as a result of presenting the list of content items using the first client device, etc.).

Alternatively and/or additionally, implementation of at least some of the disclosed subject matter may lead to benefits including a reduction in bandwidth (e.g., as a result of reducing a need for the user to scroll past and/or open content items that the user does not intend on consuming using the first client device).

In some examples, at least some of the disclosed subject matter may be implemented on a client device, and in some examples, at least some of the disclosed subject matter may be implemented on a server (e.g., hosting a service accessible via a network, such as the Internet).

Figure 7:
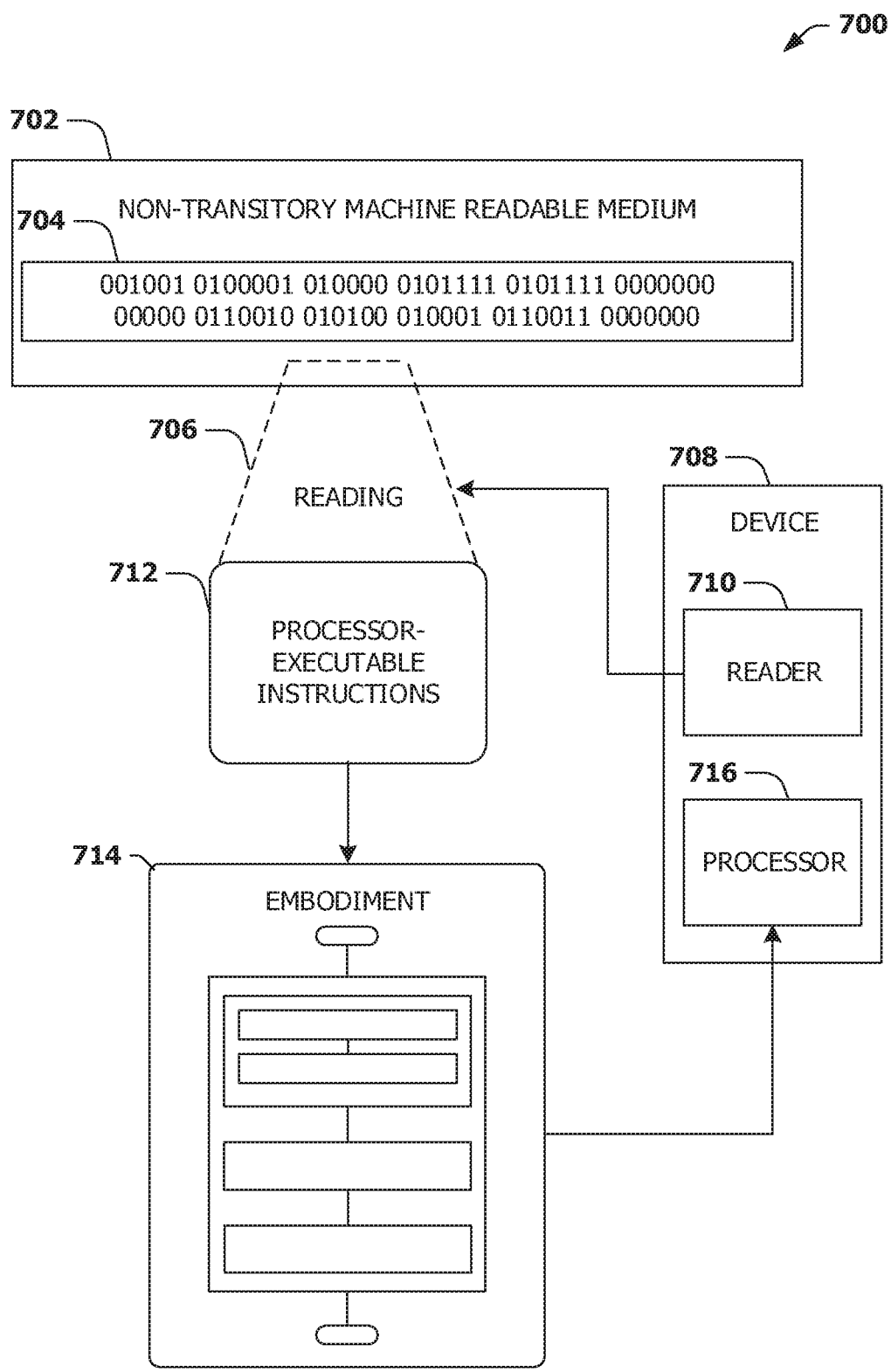
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4A, and/or the example method 450 of FIG. 4B, for example. In some embodiments, the processor-executable instructions 712 are configured to cause implementation of a system, such as at least some of the example system 501 of FIGS. 5A-5H, and/or the example system 601 of FIGS. 6A-6B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
controlling a first graphical user interface of a first device, associated with a user account, to display a first content interface, wherein the first content interface is a first version of an application and the first content interface comprises a first set of content items of a content items database, of the user account, associated with the application;
detecting first activity performed using the first content interface;
analyzing the first activity to generate a first activity profile associated with the first content interface, wherein the first activity profile is indicative of a prioritization of one or more first types of content over one or more second types of content when displaying content of the content items database of the user account on the first device;
controlling a second graphical user interface of a second device, associated with the user account, to display a second content interface, wherein the second content interface is a second version of the application and the second content interface comprises a second set of content items of the content items database;
detecting second activity performed using the second content interface;
analyzing the second activity to generate a second activity profile associated with the second content interface, wherein the second activity profile is indicative of a prioritization of the one or more second types of content over the one or more first types of content when displaying content of the content items database of the user account on the second device;
storing a plurality of activity profiles, associated with two or more devices associated with the same user account, comprising (i) the first activity profile associated with the first content interface displayed via the first device and (ii) the second activity profile associated with the second content interface displayed via the second device, wherein the plurality of activity profiles is associated with the content items database of the user account;
receiving a first request to access the application, from the first device;
responsive to the first request, selecting the first activity profile associated with the first content interface displayed via the first device, from the plurality of activity profiles associated with the two or more devices associated with the same user account, based upon a determination that the first request is associated with the first content interface displayed via the first device;
prioritizing content items of the content items database, based upon the first activity profile associated with the first content interface displayed via the first device, to generate a first list of content items associated with the first content interface; and
controlling the first graphical user interface to display the first content interface comprising the first list of content items.

2. The method of claim 1, wherein:
the detecting the first activity is performed during a first period of time;

the first activity profile is associated with a first time of day, wherein the first time of day includes the first period of time;
the receiving the first request is performed during a second period of time, wherein the first time of day includes the second period of time; and
the selecting the first activity profile is performed based upon a determination that the first request was received during the first time of day.

3. The method of claim 2, comprising:
detecting third activity performed using the first content interface during a third period of time;
analyzing the third activity to generate a third activity profile associated with the first content interface and a second time of day, wherein the second time of day includes the third period of time, wherein the second time of day is different than the first time of day;
receiving a second request to access the application, from the first device, during a fourth period of time, wherein the second time of day includes the fourth period of time;
selecting the third activity profile, from the plurality of activity profiles, based upon a determination that the second request is associated with the first content interface and that the second request was received during the second time of day;
prioritizing content items of the content items database, based upon the third activity profile, to generate a third list of content items associated with the first content interface and the second time of day; and
controlling the first graphical user interface to display the first content interface comprising the third list of content items.

4. The method of claim 1, wherein:
the detecting the first activity is performed while the first device is located within a first area;
the first activity profile is associated with the first area;
the receiving the first request is performed while the first device is located within the first area; and
the selecting the first activity profile is performed based upon a determination that the first request was received while the first device was located within the first area.

5. The method of claim 4, comprising:
detecting third activity performed using the first content interface while the first device is located within a second area, wherein the second area is different than the first area;
analyzing the third activity to generate a third activity profile associated with the first content interface and the second area;
receiving a second request to access the application, from the first device, while the first device is located within the second area;
selecting the third activity profile, from the plurality of activity profiles, based upon a determination that the second request is associated with the first content interface and that the second request was received while the first device was located within the second area;
prioritizing content items of the content items database, based upon the third activity profile, to generate a third list of content items associated with the first content interface and the second area; and
controlling the first graphical user interface to display the first content interface comprising the third list of content items.

6. The method of claim 1, wherein:
the detecting the first activity is performed while the first device is in a region determined to have a first set of weather characteristics;
the first activity profile is associated with the first set of weather characteristics;
the receiving the first request is performed while the first device is in a region determined to have the first set of weather characteristics; and
the selecting the first activity profile is performed based upon a determination that the first request was received while the first device was in a region having the first set of weather characteristics.

7. The method of claim 6, comprising:
detecting third activity performed using the first content interface while the first device is in a region determined to have a second set of weather characteristics, wherein the second set of weather characteristics is different than the first set of weather characteristics;
analyzing the third activity to generate a third activity profile associated with the first content interface and the second set of weather characteristics;
receiving a second request to access the application, from the first device, while the first device is in a region determined to have the second set of weather characteristics;
selecting the third activity profile, from the plurality of activity profiles, based upon a determination that the second request is associated with the first content interface and that the second request was received while the first device was in a region having the second set of weather characteristics;
prioritizing content items of the content items database, based upon the third activity profile, to generate a third list of content items associated with the first content interface and the second set of weather characteristics; and
controlling the first graphical user interface to display the first content interface comprising the third list of content items.

8. The method of claim 1, wherein:
the detecting the first activity is performed at a time determined to meet a first set of conditions;
the first activity profile is associated with the first set of conditions;
the receiving the first request is performed at a time determined to meet the first set of conditions; and
the selecting the first activity profile is performed based upon a determination that the first request was received at a time determined to meet the first set of conditions.

9. The method of claim 8, comprising:
detecting third activity performed using the first content interface at a time determine to have a second set of conditions, wherein the second set of conditions is different than the first set of conditions;
analyzing the third activity to generate a third activity profile associated with the first content interface and the second set of conditions;
receiving a second request to access the application, from the first device, at a time determined to meet the second set of conditions;
selecting the third activity profile, from the plurality of activity profiles, based upon a determination that the second request is associated with the first content interface and that the second request was received at a time meeting the second set of conditions;

prioritizing content items of the content items database, based upon the third activity profile, to generate a third list of content items associated with the first content interface and the second set of conditions; and
controlling the first graphical user interface to display the first content interface comprising the third list of content items.

10. The method of claim 1, wherein the first activity profile comprises:
indications of one or more types of content associated with the first activity; and
indications of one or more weights of the one or more types of content, wherein the one or more weights of the one or more types of content are determined based upon amounts of activity, of the first activity, associated with each type of content of the one or more types of content.

11. The method of claim 10, wherein the prioritizing the content items of the content items database is performed, based upon the one or more weights of the one or more types of content, to generate the first list of content items having an order of content items based upon the one or more weights of the one or more types of content.

12. The method of claim 11, wherein:
a first content item of the content items database is associated with a first type of content, of the one or more types of content, corresponding to a first weight of the one or more weights;
a second content item of the content items database is associated with a second type of content, of the one or more types of content, corresponding to a second weight of the one or more weights;
the first weight is higher than the second weight; and
the first list of content items comprises the first content item preceding the second content item.

13. The method of claim 1, wherein the first activity comprises one or more selections of one or more content items of the first set of content items.

14. A computing device comprising:
a processor; and
memory comprising processor-executable instructions that when executed by the processor cause performance of operations, the operations comprising:
controlling a first graphical user interface of a first device, associated with a user account, to display a first content interface, wherein the first content interface is a first version of an application and the first content interface comprises a first set of content items of a content items database, of the user account, associated with the application;
receiving, from the first device, one or more selections of one or more selectable inputs indicative of a request to present one or more content items, of the first set of content items, using a second device associated with the user account, wherein the second device is different than the first device;
responsive to the request from the first device to present the one or more content items using the second device, prioritizing content items of the content items database, based upon the one or more selectable inputs of the one or more selections received from the first device, to generate a first list of content items associated with the second device, wherein the first list of content items begins with the one or more content items associated with the one or more selectable inputs of the one or more selections received from the first device;
storing the first list of content items associated with the second device associated with the user account having the content items database;
receiving a first request to access the application, from the second device;
responsive to the first request, selecting the first list of content items associated with the second device, from a plurality of lists associated with the same user account, based upon a determination that the first request is associated with the second device; and
controlling a second graphical user interface of the second device, to display a second content interface comprising the first list of content items that begins with the one or more content items associated with the one or more selectable inputs of the one or more selections received from the first device, wherein the second content interface is a second version of the application.

15. The computing device of claim 14, the operations comprising:
responsive to receiving the one or more selections of the one or more selectable inputs, transmitting one or more notifications associated with the one or more content items to the second device.

16. A non-transitory machine readable medium having stored thereon processor-executable instructions that when executed cause performance of operations, the operations comprising:
controlling a first graphical user interface of a first device, associated with a user account, to display a first content interface, wherein the first content interface is a first version of an application and the first content interface comprises a first set of content items of a content items database, of the user account, associated with the application;
detecting first activity performed using the first content interface;
analyzing the first activity to generate a first activity profile associated with the first content interface, wherein the first activity profile is indicative of a prioritization of one or more first types of content over one or more second types of content when displaying content of the content items database of the user account on the first device, wherein a second activity profile is indicative of a prioritization of the one or more second types of content over the one or more first types of content when displaying content of the content items database of the user account on a second device;
storing a plurality of activity profiles, associated with two or more devices associated with the same user account, comprising (i) the first activity profile associated with the first content interface displayed via the first device and (ii) the second activity profile associated with the content displayed via the second device, wherein the plurality of activity profiles is associated with the content items database of the user account;
receiving a first request to access the application, from the first device;
responsive to the first request, selecting the first activity profile associated with the first content interface displayed via the first device, from the plurality of activity profiles associated with the two or more devices associated with the same user account, based upon a determination that the first request is associated with the first content interface displayed via the first device;
prioritizing content items of the content items database, based upon the first activity profile associated with the first content interface displayed via the first device, to generate a first list of content items associated with the first content interface; and controlling the first graphical user interface to display the first content interface comprising the first list of content items.

17. The non-transitory machine readable medium of claim 16, wherein:

the detecting the first activity is performed during a first period of time;

the first activity profile is associated with a first time of day, wherein the first time of day includes the first period of time;

the receiving the first request is performed during a second period of time, wherein the first time of day includes the second period of time; and the selecting the first activity profile is performed based upon a determination that the first request was received during the first time of day.

18. The non-transitory machine readable medium of claim 17, the operations comprising:

detecting second activity performed using the first content interface during a second period of time;

analyzing the second activity to generate a second activity profile associated with the first content interface and a second time of day, wherein the second time of day includes the second period of time, wherein the second time of day is different than the first time of day;

receiving a second request to access the application, from the first device, during a fourth period of time, wherein the second time of day includes the fourth period of time;

selecting the second activity profile, from the plurality of activity profiles, based upon a determination that the second request is associated with the first content interface and that the second request was received during the second time of day;

prioritizing content items of the content items database, based upon the second activity profile, to generate a second list of content items associated with the first content interface and the second time of day; and controlling the first graphical user interface to display the first content interface comprising the second list of content items.

19. The non-transitory machine readable medium of claim 16, wherein:

the detecting the first activity is performed while the first device is located within a first area;

the first activity profile is associated with the first area;

the receiving the first request is performed while the first device is located within the first area; and the selecting the first activity profile is performed based upon a determination that the first request was received while the first device was located within the first area.

20. The non-transitory machine readable medium of claim 19, the operations comprising:

detecting second activity performed using the first content interface while the first device is located within a second area, wherein the second area is different than the first area;

analyzing the second activity to generate a second activity profile associated with the first content interface and the second area;

receiving a second request to access the application, from the first device, while the first device is located within the second area;

selecting the second activity profile, from the plurality of activity profiles, based upon a determination that the second request is associated with the first content interface and that the second request was received while the first device was located within the second area;

prioritizing content items of the content items database, based upon the second activity profile, to generate a second list of content items associated with the first content interface and the second area; and controlling the first graphical user interface to display the first content interface comprising the second list of content items.

* * * * *